(12) United States Patent
Usoro et al.

(10) Patent No.: US 6,736,752 B2
(45) Date of Patent: May 18, 2004

(54) FAMILY OF MULTI-SPEED TRANSMISSIONS WITH THREE PLANETARY GEARSETS

(75) Inventors: Patrick Benedict Usoro, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/241,871

(22) Filed: Sep. 12, 2002

(65) Prior Publication Data

US 2004/0053735 A1 Mar. 18, 2004

(51) Int. Cl.$^7$ .......................... F16H 3/44; F16H 37/06; F16H 3/62
(52) U.S. Cl. .................. 475/296; 475/276; 475/280; 475/330
(58) Field of Search ................. 475/296, 271, 475/275, 276, 280, 282, 284, 286, 288, 290, 293, 330, 311, 317, 323

(56) References Cited

U.S. PATENT DOCUMENTS

| 4,070,927 | A |  | 1/1978 | Polak ........................... 74/765 |
| 4,709,594 | A |  | 12/1987 | Maeda ......................... 74/753 |
| 5,106,352 | A |  | 4/1992 | Lepelletier ................. 475/280 |
| 5,133,697 | A | * | 7/1992 | Hattori ........................ 475/276 |
| 5,226,862 | A | * | 7/1993 | Hattori ........................ 475/286 |
| 5,599,251 | A |  | 2/1997 | Beim et al. ................. 475/275 |
| 6,053,839 | A |  | 4/2000 | Baldwin et al. ............ 475/281 |
| 6,071,208 | A |  | 6/2000 | Koivunen ................... 475/275 |
| 6,083,135 | A |  | 7/2000 | Baldwin et al. ............ 475/276 |
| 6,217,474 | B1 |  | 4/2001 | Ross et al. .................. 475/296 |
| 6,425,841 | B1 | * | 7/2002 | Haka ........................... 475/275 |
| 6,514,170 | B1 | * | 2/2003 | Kao et al. ................... 475/296 |
| 6,530,858 | B1 | * | 3/2003 | Usoro et al. ................ 475/296 |
| 6,589,129 | B2 | * | 7/2003 | Usoro et al. ................ 475/275 |

FOREIGN PATENT DOCUMENTS

| EP | 1033510 |  | 3/2000 |  |
| JP | 06323377 A | * | 11/1994 | ............. F16H/3/44 |
| JP | 09112638 A | * | 5/1997 | ............. F16H/3/62 |
| JP | 9-126283 |  | 5/1997 |  |

* cited by examiner

Primary Examiner—Tisha D Lewis
(74) Attorney, Agent, or Firm—Kathryn A. Marra

(57) ABSTRACT

A family of transmissions is incorporated into powertrains to provide six forward speed ratios and one reverse speed ratio between an engine and a final drive mechanism. Each of the family members includes three planetary gearsets, one of which is an input planetary gearset and the other two are interconnected ratio planetary gearsets. Each transmission family member employs three rotating type torque-transmitting mechanisms (clutches) and two stationary type torque-transmitting mechanisms (brakes) to provide the six forward speed ratios and one reverse speed ratio. These torque-transmitting mechanisms are selectively engaged in combinations of two during the establishment of the speed ratios within the family member. Two of the rotating torque transmitting mechanisms are selectively connectable between the faster rotating member of the input planetary gearset and the two interconnected planetary gearsets and the remaining rotating torque transmitting mechanism is selectively connectable between the slower rotating member of the input planetary gearset and at least one member of the interconnected planetary gearsets.

6 Claims, 13 Drawing Sheets

| | Ratios | 56 | 58 | 50 | 52 | 54 |
|---|---|---|---|---|---|---|
| Reverse | -1.12 | | X | X | | |
| Neutral | 0 | | X | | | |
| 1 | 1.85 | | X | | | X |
| 2 | 1.22 | X | | | | X |
| 3 | 0.78 | | | X | | X |
| 4 | 0.59 | | | | X | X |
| 5 | 0.4 | | | X | X | |
| 6 | 0.29 | X | | | X | |

(X=engaged clutch)

$\frac{RING\ GEAR}{SUN\ GEAR}$ =TOOTH RATIO: $\frac{R_1}{S_1}=2.83$, $\frac{R_2}{S_2}=1.53$, $\frac{R_3}{S_3}=1.53$

| Ratio Spread | 6.34 |
|---|---|
| Ratio Steps | |
| Rev/1 | -0.6 |
| 1/2 | 1.52 |
| 2/3 | 1.56 |
| 3/4 | 1.33 |
| 4/5 | 1.48 |
| 5/6 | 1.35 |

| | Ratios | 156 | 158 | 150 | 152 | 154 |
|---|---|---|---|---|---|---|
| Reverse | -2.83 | | X | X | | |
| Neutral | 0 | | X | | | |
| 1 | 4.69 | | X | | | X |
| 2 | 3.09 | X | | | | X |
| 3 | 1.98 | | | X | | X |
| 4 | 1.48 | | | | X | X |
| 5 | 1 | | | X | X | |
| 6 | 0.74 | X | | | X | |

(X=engaged clutch)

$\frac{RING\ GEAR}{SUN\ GEAR}$ = TOOTH RATIO: $\frac{R_1}{S_1}=2.83,\ \frac{R_2}{S_2}=1.53,\ \frac{R_3}{S_3}=1.53$

| Ratio Spread | 6.34 |
|---|---|
| Ratio Steps | |
| Rev/1 | -0.6 |
| 1/2 | 1.52 |
| 2/3 | 1.56 |
| 3/4 | 1.33 |
| 4/5 | 1.48 |
| 5/6 | 1.35 |

| | Ratios | 256 | 258 | 250 | 252 | 254 |
|---|---|---|---|---|---|---|
| Reverse | -2.83 | | X | X | | |
| Neutral | 0 | | X | | | |
| 1 | 4.67 | | X | | | X |
| 2 | 3.09 | X | | | | X |
| 3 | 1.98 | | | X | | X |
| 4 | 1.49 | | | | X | X |
| 5 | 1 | | | X | X | |
| 6 | 0.74 | X | | | X | |

(X=engaged clutch)

$\dfrac{RING\ GEAR}{SUN\ GEAR}$ = TOOTH RATIO: $\dfrac{R_1}{S_1}=1.53,\quad \dfrac{R_2}{S_2}=2.83,\quad \dfrac{R_3}{S_3}=1.53$

| Ratio Spread | 6.33 |
|---|---|
| Ratio Steps | |
| Rev/1 | -0.6 |
| 1/2 | 1.51 |
| 2/3 | 1.56 |
| 3/4 | 1.33 |
| 4/5 | 1.49 |
| 5/6 | 1.35 |

| | Ratios | 356 | 358 | 350 | 352 | 354 |
|---|---|---|---|---|---|---|
| Reverse | -3.89 | | X | X | | |
| Neutral | 0 | | X | | | |
| 1 | 4.61 | | X | | | X |
| 2 | 2.42 | X | | | | X |
| 3 | 1.55 | | | X | | X |
| 4 | 1 | | | | X | X |
| 5 | 0.72 | | | X | X | |
| 6 | 0.61 | X | | | X | |

(X=engaged clutch)

$$\frac{RING\ GEAR}{SUN\ GEAR} = TOOTH\ RATIO: \quad \frac{R_1}{S_1}=1.54, \quad \frac{R_2}{S_2}=3.00, \quad \frac{R_3}{S_3}=1.53$$

| Ratio Spread | 7.61 |
|---|---|
| Ratio Steps | |
| Rev/1 | -0.84 |
| 1/2 | 1.9 |
| 2/3 | 1.56 |
| 3/4 | 1.55 |
| 4/5 | 1.39 |
| 5/6 | 1.18 |

| | Ratios | 456 | 458 | 450 | 452 | 454 |
|---|---|---|---|---|---|---|
| Reverse | -3.84 | X | | | | X |
| Neutral | 0 | X | | | | |
| 1 | 3.99 | X | | | X | |
| 2 | 2.19 | | X | | X | |
| 3 | 1.49 | | | | X | X |
| 4 | 1 | | | X | X | |
| 5 | 0.72 | | | X | | X |
| 6 | 0.6 | | X | X | | |

(X=engaged clutch)

$\dfrac{\text{RING GEAR}}{\text{SUN GEAR}} = \text{TOOTH RATIO:}\quad \dfrac{R_1}{S_1}=2.99,\quad \dfrac{R_2}{S_2}=1.52,\quad \dfrac{R_3}{S_3}=1.53$

| Ratio Spread | 6.61 |
|---|---|
| Ratio Steps | |
| Rev/1 | -0.96 |
| 1/2 | 1.82 |
| 2/3 | 1.47 |
| 3/4 | 1.49 |
| 4/5 | 1.4 |
| 5/6 | 1.19 |

| | Ratios | 556 | 558 | 550 | 552 | 554 |
|---|---|---|---|---|---|---|
| Reverse | -5.77 | X | | | | X |
| Neutral | 0 | X | | | | |
| 1 | 6.33 | X | | X | | |
| 2 | 3.09 | | X | X | | |
| 3 | 1.98 | | | X | | X |
| 4 | 1.32 | | | X | X | |
| 5 | 1 | | | | X | X |
| 6 | 0.85 | | X | | X | |

(X=engaged clutch)

$\frac{RING\ GEAR}{SUN\ GEAR}$ = TOOTH RATIO: $\frac{R_1}{S_1}=1.50$, $\frac{R_2}{S_2}=2.31$, $\frac{R_3}{S_3}=1.53$

| Ratio Spread | 7.42 |
|---|---|
| Ratio Steps | |
| Rev/1 | -0.91 |
| 1/2 | 2.05 |
| 2/3 | 1.56 |
| 3/4 | 1.5 |
| 4/5 | 1.32 |
| 5/6 | 1.17 |

| | Ratios | 656 | 658 | 650 | 652 | 654 |
|---|---|---|---|---|---|---|
| Reverse | -1.33 | X | | | | X |
| Neutral | 0 | X | | | | |
| 1 | 1.37 | X | | X | | |
| 2 | 0.79 | | X | X | | |
| 3 | 0.55 | | | X | | X |
| 4 | 0.35 | | | X | X | |
| 5 | 0.24 | | | | X | X |
| 6 | 0.2 | | X | | X | |

(X=engaged clutch)

$\dfrac{\text{RING GEAR}}{\text{SUN GEAR}}$ =TOOTH RATIO: $\dfrac{R_1}{S_1}=2.90$, $\dfrac{R_2}{S_2}=2.93$, $\dfrac{R_3}{S_3}=1.85$

| Ratio Spread | 6.83 |
|---|---|
| Ratio Steps | |
| Rev/1 | -0.97 |
| 1/2 | 1.74 |
| 2/3 | 1.44 |
| 3/4 | 1.56 |
| 4/5 | 1.49 |
| 5/6 | 1.18 |

| | Ratios | 756 | 758 | 750 | 752 | 754 |
|---|---|---|---|---|---|---|
| Reverse | -2.55 | | X | X | | |
| Neutral | 0 | | X | | | |
| 1 | 4.61 | | X | | | X |
| 2 | 2.42 | X | | | | X |
| 3 | 1.31 | | | X | | X |
| 4 | 1 | | | | X | X |
| 5 | 0.79 | | | X | X | |
| 6 | 0.61 | X | | | X | |

(X=engaged clutch)

$\dfrac{\text{RING GEAR}}{\text{SUN GEAR}}$ =TOOTH RATIO: $\quad \dfrac{R_1}{S_1}=1.54, \quad \dfrac{R_2}{S_2}=3.00, \quad \dfrac{R_3}{S_3}=1.51$

| Ratio Spread | 7.61 |
|---|---|
| Ratio Steps | |
| Rev/1 | -0.55 |
| 1/2 | 1.9 |
| 2/3 | 1.86 |
| 3/4 | 1.31 |
| 4/5 | 1.26 |
| 5/6 | 1.31 |

| | Ratios | 1056 | 1058 | 1050 | 1052 | 1054 |
|---|---|---|---|---|---|---|
| Reverse | -2.95 | | X | X | | |
| Neutral | 0 | | X | | | |
| 1 | 3.58 | | X | | | X |
| 2 | 2.02 | X | | | | X |
| 3 | 1.32 | | | X | | X |
| 4 | 1 | | | | X | X |
| 5 | 0.76 | | | X | X | |
| 6 | 0.6 | X | | | X | |

(X=engaged clutch)

$\frac{\text{RING GEAR}}{\text{SUN GEAR}}$ =TOOTH RATIO: $\frac{R_1}{S_1}=1.53,\ \frac{R_2}{S_2}=2.34,\ \frac{R_3}{S_3}=2.08$

| Ratio Spread | 5.93 |
|---|---|
| Ratio Steps | |
| Rev/1 | -0.82 |
| 1/2 | 1.77 |
| 2/3 | 1.53 |
| 3/4 | 1.32 |
| 4/5 | 1.31 |
| 5/6 | 1.26 |

| | Ratios | 1156 | 1158 | 1150 | 1152 | 1154 |
|---|---|---|---|---|---|---|
| Reverse | -2.83 | X | | X | | |
| Neutral | 0 | X | | | | |
| 1 | 4.69 | X | | | | X |
| 2 | 3.09 | | X | | | X |
| 3 | 1.98 | | | X | | X |
| 4 | 1.48 | | | | X | X |
| 5 | 1 | | | X | X | |
| 6 | 0.74 | | X | | X | |

(X=engaged clutch)

$\dfrac{\text{RING GEAR}}{\text{SUN GEAR}}$ =TOOTH RATIO: $\dfrac{R_1}{S_1}=2.83$, $\dfrac{R_2}{S_2}=1.53$, $\dfrac{R_3}{S_3}=1.65$

| Ratio Spread | 6.34 |
|---|---|
| Ratio Steps | |
| Rev/1 | -0.6 |
| 1/2 | 1.52 |
| 2/3 | 1.56 |
| 3/4 | 1.33 |
| 4/5 | 1.48 |
| 5/6 | 1.35 |

| | Ratios | 1256 | 1258 | 1250 | 1252 | 1254 |
|---|---|---|---|---|---|---|
| Reverse | -3.63 | | X | | X | |
| Neutral | 0 | | X | | | |
| 1 | 5.38 | | X | X | | |
| 2 | 2.83 | X | | X | | |
| 3 | 1.66 | | | X | X | |
| 4 | 1.27 | | | X | | X |
| 5 | 1 | | | | X | X |
| 6 | 0.78 | X | | | | X |

(X=engaged clutch)

$\dfrac{RING\ GEAR}{SUN\ GEAR}$ = TOOTH RATIO: $\dfrac{R_1}{S_1}=3.03$, $\dfrac{R_2}{S_2}=1.53$, $\dfrac{R_3}{S_3}=1.89$

| Ratio Spread | 6.86 |
|---|---|
| Ratio Steps | |
| Rev/1 | -0.67 |
| 1/2 | 1.9 |
| 2/3 | 1.7 |
| 3/4 | 1.31 |
| 4/5 | 1.27 |
| 5/6 | 1.28 |

| | Ratios | 1356 | 1358 | 1350 | 1352 | 1354 |
|---|---|---|---|---|---|---|
| Reverse | -1.12 | X | | X | | |
| Neutral | 0 | X | | | | |
| 1 | 1.85 | X | | | | X |
| 2 | 1.22 | | X | | | X |
| 3 | 0.78 | | | X | | X |
| 4 | 0.59 | | | | X | X |
| 5 | 0.4 | | | X | X | |
| 6 | 0.29 | | X | | X | |

(X=engaged clutch)

$\dfrac{\text{RING GEAR}}{\text{SUN GEAR}} = $ TOOTH RATIO: $\dfrac{R_1}{S_1} = 2.83, \quad \dfrac{R_2}{S_2} = 1.53, \quad \dfrac{R_3}{S_3} = 1.65$

| Ratio Spread | 6.34 |
|---|---|
| Ratio Steps | |
| Rev/1 | -0.6 |
| 1/2 | 1.52 |
| 2/3 | 1.56 |
| 3/4 | 1.33 |
| 4/5 | 1.48 |
| 5/6 | 1.35 |

| | Ratios | 1556 | 1558 | 1550 | 1552 | 1554 |
|---|---|---|---|---|---|---|
| Reverse | -2.95 | | X | X | | |
| Neutral | 0 | | X | | | |
| 1 | 3.58 | | X | | | X |
| 2 | 2.02 | X | | | | X |
| 3 | 1.32 | | | X | | X |
| 4 | 1 | | | | X | X |
| 5 | 0.76 | | | X | X | |
| 6 | 0.6 | X | | | X | |

(X=engaged clutch)

$\dfrac{\text{RING GEAR}}{\text{SUN GEAR}}$ =TOOTH RATIO:  $\dfrac{R_1}{S_1}=2.53,\quad \dfrac{R_2}{S_2}=2.34,\quad \dfrac{R_3}{S_3}=2.08$

| Ratio Spread | 5.93 |
|---|---|
| Ratio Steps | |
| Rev/1 | -0.82 |
| 1/2 | 1.77 |
| 2/3 | 1.53 |
| 3/4 | 1.32 |
| 4/5 | 1.31 |
| 5/6 | 1.26 |

FAMILY OF MULTI-SPEED TRANSMISSIONS WITH THREE PLANETARY GEARSETS

TECHNICAL FIELD

The present invention is related to power transmissions and, more particularly, to a family of power transmissions having three planetary gearsets that are controlled by five torque-transmitting mechanisms to establish at least six forward speed ratios and one reverse speed ratio.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997; U.S. Pat. No. 6,083,135 issued to Baldwin et al. on Jul. 4, 2000, and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved family of multi-speed transmissions having three planetary gearsets and five torque-transmitting mechanisms for providing at least six forward speed ratios.

In one aspect of the present invention, the transmission is disposed in a powertrain and has an input shaft driven by an engine and an output shaft driving a final drive mechanism.

In another aspect of the present invention, one of the planetary gearsets has a first member continuously interconnected with the input shaft, a member continuously interconnected with a stationary transmission housing, and a third member which is noncontinuously connected to other transmission members.

In still another aspect of the present invention, the two remaining planetary gearsets have first respective members continuously interconnected and second respective members continuously interconnected.

In yet another aspect of the present invention, the first interconnecting member is continuously connected with the output shaft or selectively connectable with the transmission housing through a stationary torque transmitting mechanism. The second interconnecting member is selectively connectable with either the transmission housing through a stationary torque transmitting mechanism or the noncontinuously connected member of the first mentioned planetary gearset, through a rotating torque transmitting mechanism.

In yet another aspect of the present invention, at least one of the two remaining planetary gearsets has a member continuously interconnected with the transmission output shaft and one of the two remaining planetary gearsets has at least one noncontinuously interconnected member.

In yet still another aspect of the present invention, a non-stationary member of the first mentioned planetary gearset is selectively connectible with a member of one of the other planetary gearsets through a selectively engageable torque-transmitting mechanism.

In a further aspect of the present invention, two torque-transmitting mechanisms selectively connect the other non-stationary member of the first mentioned planetary gearset with members of the interconnected planetary gearsets.

In a still further aspect of the present invention, a fourth selectively engageable torque-transmitting mechanism is operable to selectively connect at least one member of the two remaining planetary gearsets with a stationary component, such as the transmission housing.

In yet still a further aspect of the present invention, a fifth torque-transmitting mechanism is selectively engageable to connect at least one member of the remaining two planetary gearsets with a transmission housing member.

In accordance with the object and aspects of the present invention, each family member has three planetary gearsets with each gearset including three members. The first, second or third member of each planetary gearset may be any one of a sun gear member, a ring gear member, or a planet carrier assembly member. The first member of the first planetary gearset is continuously connected with the first member of the second planetary gearset. The second member of the first planetary gearset is continuously connected with the second member of the second planetary gearset. The first member of the third planetary gearset is continuously connected with the input shaft. The second member of the third planetary gearset is continuously connected with a transmission housing. The third member of the third planetary gearset is rotated at a speed proportional to the first member of the third planetary gearset at a speed that may be increased from or reduced from the first member. Therefore the third planetary gearset has a high speed member, a low speed member, and a stationary member.

The first stationary torque-transmitting mechanism connects a member of the first planetary gearset to a transmission housing. The second selectively engageable stationary torque-transmitting mechanism connects a member of the first or second planetary gearset to the transmission housing. The first selectively engageable rotating torque-transmitting mechanism selectively interconnects the low speed member of the third planetary gearset with a member of the first or second planetary gearset. A second selectively engageable rotating torque-transmitting mechanism connects the high speed member of the third planetary gearset with a member of the first or second planetary gearset. The third selectively engageable rotating torque-transmitting mechanism selectively interconnects the high speed member of the third planetary gearset with a member of the first or second planetary gearsets. The input path to the first of the rotating torque-transmitting mechanisms, as described above, is slower than or reduced in speed from the rotational speed of the input path to the second and third rotating torque-transmitting mechanisms.

The five selectively engageable torque-transmitting mechanisms are engaged in combinations of two to establish at least six forward speed ratios and one reverse speed ratio in the planetary gearsets between the input shaft and the output shaft of the transmission.

DESCRIPTION OF THE EXEMPLARY EMBODIMENTS

Figures 1, 2:
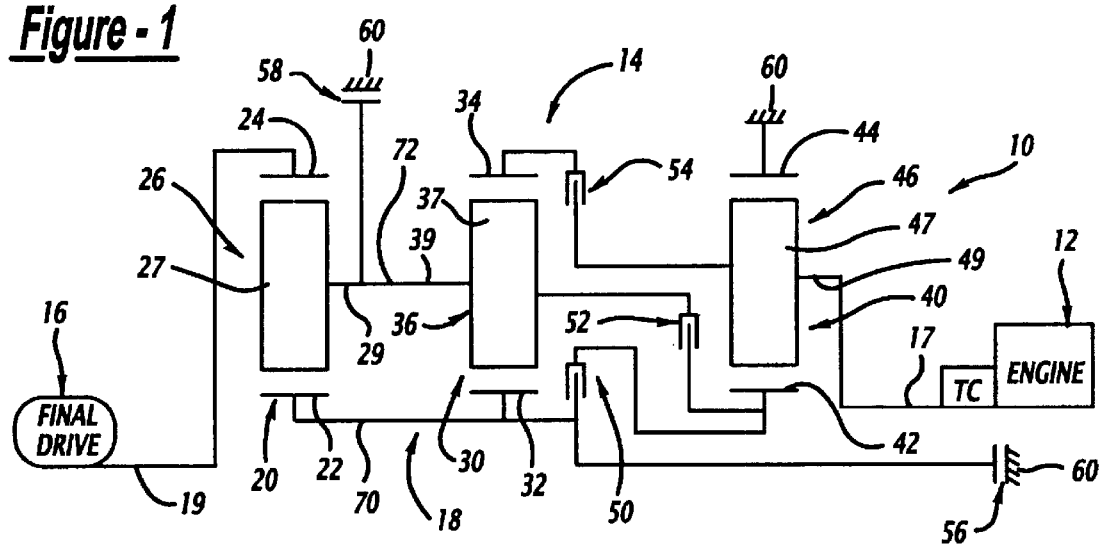
FIG. 1 is a schematic representation of a powertrain employing one family member incorporating the present invention.
FIG. 2 is a truth table and chart providing the engagement combination with the torque-transmitting mechanisms as well as speed ratio values of the family member shown in FIG. 1.

Referring to the drawings, wherein like characters represent the same or corresponding parts throughout the several views, there is seen in FIG. 1, a powertrain 10 having an engine and torque converter 12, a planetary transmission 14, and the final drive mechanism 16. The planetary transmission 14 includes the input shaft 17, a planetary gear arrangement 18, and the output shaft 19. The planetary gear arrangement 18 includes three planetary gearsets 20, 30, and 40. The planetary gear arrangement 18 also includes three rotatable torque-transmitting mechanisms 50, 52, and 54, and two stationary torque-transmitting mechanisms 56 and 58.

The planetary gearset 20 includes a sun gear member 22, a ring gear member 24, and a planet carrier assembly member 26 having a variety of pinion gears 27 rotatably mounted on a planet carrier 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 has a plurality of pinion gears 37 rotatably mounted on a planet carrier 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 has a plurality of pinion gears 47 that are rotatably mounted on a carrier 49 and disposed in meshing relationship with the sun gear member 42 and the ring gear member 44.

The sun gear members 22 and 32 are continuously interconnected by an interconnecting member 70. The planet carrier assembly members 26 and 36 are continuously interconnected by an interconnecting member 72. The input shaft 17 is continuously connected with the planet carrier assembly member 46 and selectively connectible with the ring gear member 34 through the torque-transmitting mechanism 54. The sun gear member 42 is selectively connectible with the interconnecting member 70 through the torque-transmitting mechanism 50, and with the interconnecting member 72 through the torque-transmitting mechanism 52. The ring gear member 44 is continuously connected with the transmission housing 60. The interconnecting member 70 is selectively connectible with the transmission housing 60 through the torque-transmitting mechanism 56. The interconnecting member 72 is selectively connectible with the transmission housing 60 through the torque-transmitting mechanism 58. The planetary gearset 40 is an overdrive gearset. That is the sun gear member 42 rotates at a faster speed than the planet carrier assembly member 46 which is driven by the input shaft 17. The torque transmitting mechanisms 50 and 52 selectively connect the faster rotating member (sun gear member 42) of the planetary gearset 40 with members of the planetary gearsets 20 and 30 while the torque transmitting mechanism 54 selectively connects the slower rotating member of the planetary gearset 40 (planet carrier assembly member 46) with the ring gear member 34.

The truth table and chart in FIG. 2 describe the engagement sequence and combinations of engagements for the torque-transmitting mechanisms, as well as providing an example of the numerical ratios for the six forward speed ratios and one reverse speed ratio, as well as the ratio steps between adjacent forward speed ratios. These numerical values are determined utilizing the ring gear/sun gear tooth ratios of the planetary gearsets 20, 30, and 40, as represented by the ratios R1/S1, R2/S2, and R3/S3, respectively.

Those skilled in the art will recognize that the numerical value of the reverse speed ratio is determined utilizing the ring gear/sun gear tooth ratios of the planetary gearsets 20 and 40. The reverse speed ratio is established with the engagement of the torque transmitting mechanisms 50 and 58. The sun gear member 42 and the sun gear member 22 are driven at a speed determined by the speed of the planet carrier assembly member 46 (input) and the tooth ratio of the planetary gearset 20. The ring gear member 24 and the output shaft 19 are driven at a speed determined by the speed of the sun gear member 22 and the tooth ratio of the planetary gearset 20.

The first forward speed ratio is established with the engagement of the torque transmitting mechanisms 54 and 58. The ring gear member 34 is driven at a speed equal to the speed of the planet carrier assembly member 46 and the speed of the input shaft 17. The sun gear member 32 and 22 are driven at a speed determined by the speed of the ring gear member 34 and the tooth ratio of the planetary gearset 30. The ring gear member 24 and therefore the output shaft 19 are driven at a speed determined by the speed of the sun gear member 22 and the tooth ratio of the planetary gearset 20. The numerical value of the first forward speed ratio is determined utilizing the ring gear/sun gear tooth ratios of the planetary gearsets 20 and 30.

The second forward speed ratio is established with the engagement of the torque transmitting mechanisms 54 and 56. During the second speed ratio, the planet carrier assembly members 36 and 26 are driven at a speed determined by the speed of the ring gear member 34 and the tooth ratio of the planetary gearset 30. The ring gear member 24 and therefore the output shaft 19 are driven at a speed determined by the speed of the planet carrier assembly member 26 and the tooth ratio of the planetary gearset 20. The numerical value of the second forward speed ratio is determined utilizing the ring gear/sun gear tooth ratios of the planetary gearsets 20 and 30.

The third forward speed ratio is established with the engagement of the torque transmitting mechanisms 54 and 50. During the third forward speed ratio, the ring gear member 34 is driven at the speed of the input shaft 17. The sun gear members 32 and 22 are driven at the speed of the sun gear member 42 as determined by the speed of the input shaft 17 and the tooth ratio of the planetary gearset 20. The planet carrier assembly members 36 and 26 are driven at a speed determined by the speed of the ring gear member 34, the speed of the sun gear member 32, and the tooth ratio of the planetary gearset 30. The ring gear member 24 and therefore the output shaft 19 are driven at a speed determined by the speed of the sun gear member 22, the speed of the planet carrier assembly member 26, and the tooth ratio of the planetary gearset 20. The numerical values for the third forward speed ratio is determined utilizing the ring gear/sun gear tooth ratios of all three planetary gearsets 20, 30, and 40.

The fourth forward speed ratio is established with the engagement of the torque transmitting mechanisms 52 and 54. During the fourth forward speed ratio, the ring gear member 34 is rotated in unison with the planet carrier assembly member 46 and the input shaft 17. The planet carrier assembly members 26 and 36 are rotated at a speed determined by the speed of the planet carrier assembly member 46 and the tooth ratio of the planetary gearset 40. The sun gear members 32 and 22 are rotated at a speed determined by the speed of the ring gear member 34, the speed of the planet carrier assembly member 36, and the tooth ratio of the planetary gearset 30. The ring gear member 24 and therefore the output shaft 19 are rotated at a speed determined by the speed of the sun gear member 22, the speed of the planet carrier assembly member 26, and the tooth ratio of the planetary gearset 20. The numerical valve of the fourth forward speed ratio is determined by the tooth ratios of all three planetary gearsets 20, 30, and 40.

The fifth forward speed ratio is established with the engagement of the torque transmitting mechanisms 50 and 52. The planetary gearsets 20 and 30 and the output shaft 19 are rotated in unison with the sun gear member 42 which has a speed determined by the speed of the planet carrier assembly member 46 and the tooth ratio of the planetary gearset 40. The numerical value of the fifth forward speed ratio is determined utilizing the ring gear/sun gear tooth ratio of the planetary gearset 40.

The sixth forward speed ratio is established with the engagement of the torque transmitting mechanisms 52 and 56. During the sixth forward speed ratio, the sun gear member 42 and planet carrier assembly member 26 are rotated at a speed determined by the speed of the planet carrier assembly member 46 and the tooth ratio of the planetary gearset 40. The ring gear member 24 and therefore the output shaft 19 are driven at a speed determined by the speed of the planet carrier assembly member 26 and the tooth ratio of the planetary gearset 20. The sixth forward speed ratio has a value determined utilizing the ring gear/sun gear tooth ratios of the planetary gearsets 20 and 40.

Figures 3, 4:
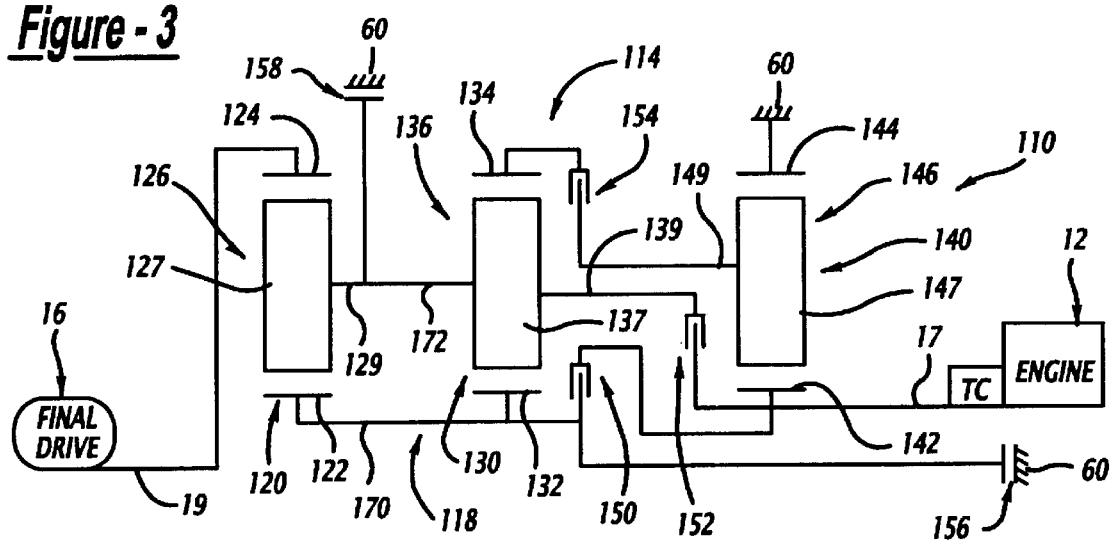
FIG. 3 is a schematic representation of a powertrain employing another family member incorporating the present invention.
FIG. 4 is a truth table and chart providing the engagement combination with the torque-transmitting mechanisms as well as speed ratio values of the family member shown in FIG. 3.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140. The planetary gear arrangement 118 also includes three rotatable torque-transmitting mechanisms 150, 152, and 154, and two stationary torque-transmitting mechanisms 156 and 158.

The planetary gearset 120 includes a sun gear member 122, a ring gear member 124, and a planet carrier assembly member 126 having a variety of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 has a plurality of pinion gears 137 rotatably mounted on a planet carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 has a plurality of pinion gears 147 that are rotatably mounted on a carrier 149 and disposed in meshing relationship with the sun gear member 142 and the ring gear member 144.

The sun gear members 122 and 132 are continuously interconnected by an interconnecting member 170. The planet carrier assembly members 126 and 136 are continuously interconnected by an interconnecting 172. The input shaft 17 is continuously connected with the sun gear member 142 and selectively connectible through the interconnecting member 170 through the torque-transmitting mechanism 150, and selectively connectible through the interconnecting member 172 through the torque-transmitting mechanism 152.

The ring gear member 144 is continuously connected with the transmission housing 60. The planet carrier assembly member 146 is selectively connectible with the ring gear member 134 through the torque-transmitting mechanism 154. The interconnecting member 170 is selectively connectible with the transmission housing 60 through the torque-transmitting mechanism 156. The interconnecting member 172 is selectively connectible with the transmission housing 60 through the torque-transmitting mechanism 158. It should be noted that the ring gear member 134 is non-continuously interconnected with any other member of the planetary gear arrangement 118 except for the pinion gear 137.

The truth table of FIG. 4 describes the engagement combinations and sequence for the torque-transmitting mechanisms to establish six forward speed ratios and one reverse speed ratio through the planetary gear arrangement 118 between the input shaft 17 and the output shaft 19.

The reverse speed ratio is established with the engagement of the torque-transmitting mechanisms 150 and 158. During the reverse speed ratio, the ring gear member 124 and therefore output shaft 19 are driven at a speed determined by the speed of the sun gear member 122 and the ring gear/sun gear tooth ratio of the planetary gearset 120. The numerical value of the reverse speed ratio is determined by the ring gear/sun gear tooth ratio of the planetary gearset 120.

The first forward speed ratio is established with the engagement of the torque-transmitting mechanisms 154 and 158. During the first forward speed ratio, the ring gear member 134 is driven at the speed of the planet carrier assembly member 146. The sun gear members 132 and 122 are driven at a speed determined by the speed of the ring gear member 134 and the ring gear/sun gear tooth ratio of the planetary gearset 130. The ring gear member 124 and therefore output shaft 19 are driven at a speed determined by the speed of the sun gear member 122 and the ring gear/sun gear tooth ratio of the planetary gearset 120. The numerical value of the first forward speed ratio is determined by the ring gear/sun gear tooth ratios of all three planetary gearsets 120, 130, and 140.

The second forward speed ratio is established with the engagement of the torque-transmitting mechanisms 154 and 156. During the second forward speed ratio, the ring gear member 134 is driven at the speed of the planet carrier assembly member 126. The planet carrier assembly members 136 and 146 are driven at a speed determined by the speed of the ring gear member 134 and the ring gear/sun gear tooth ratio of the planetary gearset 130. The ring gear member 124 and therefore output shaft 19 are driven at a speed determined by the speed of the planet carrier assembly member 126 and the ring gear/sun gear tooth ratio of the planetary gearset 120. The numerical value of the second forward speed ratio is determined by the ring gear/sun gear tooth ratios of all three planetary gearsets 120, 130, and 140.

The third forward speed ratio is established with the engagement of the torque-transmitting mechanisms 150 and 154. During the third forward speed ratio, the ring gear member 134 is driven at the speed of the planet carrier assembly member 146. The planet carrier assembly member 136 and planet carrier assembly member 126 are driven at a speed determined by the speed of the sun gear member 132, the speed of the ring gear member 134, and the ring gear/sun gear tooth ratio of planetary gearset 130. The ring gear member 124 and therefore output shaft 19 are driven at a speed determined by the speed of the sun gear member 122, the speed of the planet carrier assembly member 126, and the ring gear/sun gear tooth ratio of the planetary gearset 120. The numerical value of the third forward speed ratio is determined by the ring gear/sun gear tooth ratios of all three planetary gearsets 120, 130, and 140.

The fourth forward speed ratio is established with the engagement of the torque transmitting mechanisms 152 and 154. During the fourth forward speed ratio, the planet carrier assembly member 146 and the ring gear member 134 are rotated at a speed determined by the speed of the sun gear member 142 and the tooth ratio of the planetary gearset 140. The sun gear members 132 and 122 are rotated at a speed determined by the speed of the planet carrier assembly member 136 (input), the speed of the ring gear member 134, and the tooth ratio of the planetary gearset 130. The ring gear member 124 and therefore output shaft 19 are rotated at a speed determined by the speed of the planet carrier assembly member 126 (input), the speed of the sun gear member 122, and the tooth ratio of the planetary gearset 120. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150 and 152. The planetary gearsets 130 and 120 are rotated in unison with the input shaft 17 during the fifth forward speed ratio, which has a numerical value of one.

The sixth forward speed ratio is established with the engagement of the torque-transmitting mechanisms 156 and 152. During the sixth forward speed ratio, the planet carrier assembly member 126 is driven by the input shaft 17. The ring gear member 124 and therefore output shaft 19 are rotated at a speed determined by the speed of the planet carrier assembly member 126 and the ring gear/sun gear tooth ratio of the planetary gearset 120. The numerical value of the sixth forward speed ratio is determined by the ring gear/sun gear tooth ratio of the planetary gearset 120.

The truth table and chart of FIG. 4 provide examples of numerical values for the forward speed ratios and the reverse speed ratio, as well as the ratio steps between adjacent forward speed ratios and the reverse and first speed ratios. These numerical values are determined by the example ring gear/sun gear tooth ratios for the planetary gearsets 120, 130, and 140 as represented by R1/S1, R2/S2, and R3/S3, respectively.

Figures 5, 6:
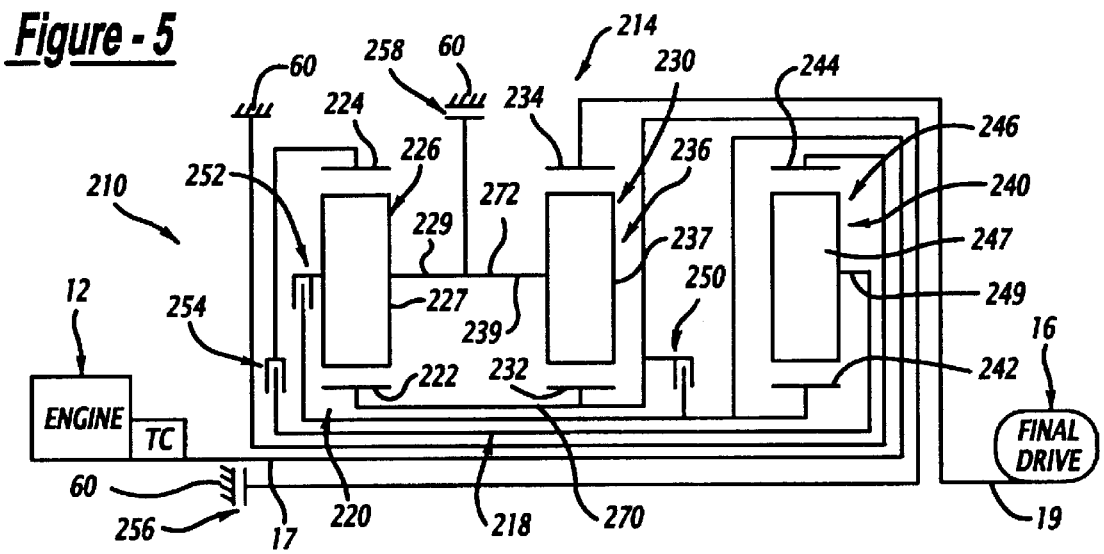
FIG. 5 is a schematic representation of a powertrain employing another family member incorporating the present invention.
FIG. 6 is a truth table and chart providing the engagement combination with the torque-transmitting mechanisms as well as speed ratio values of the family member shown in FIG. 5.

A powertrain 210, shown in FIG. 5, includes the conventional engine and torque converter 12, a planetary transmission 214, and the conventional final drive mechanism 16. The planetary transmission 214 includes an input shaft 17, a planetary gear arrangement 218, and an output shaft 19. The planetary gear arrangement 218 includes a first planetary gearset 220, a second planetary gearset 230, and a third planetary gearset 240. The planetary gear arrangement 218 also includes three rotatable torque-transmitting mechanisms 250, 252, and 254, and two stationary torque-transmitting mechanisms 256 and 258.

The planetary gearset 220 includes a sun gear member 222, a ring gear member 224, and a planet carrier assembly member 226 having a variety of pinion gears 227 rotatably mounted on a planet carrier 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 has a plurality of pinion gears 237 rotatably mounted on a planet carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 has a plurality of pinion gears 247 that are rotatably mounted on a carrier 249 and disposed in meshing relationship with the sun gear member 242 and the ring gear member 244.

The sun gear member 222 and sun gear member 232 are continuously interconnected by an interconnecting member 270. The planet carrier assembly member 226 and planet carrier assembly member 236 are continuously interconnected by an interconnecting member 272. The sun gear member 242 is continuously connected with the input shaft 17. The ring gear member 234 is continuously connected with the output shaft 19. The ring gear member 244 is continuously connected with a transmission housing 60.

The sun gear members 222 and 232 are selectively connectible with the input shaft 17 and the sun gear member 242 through the torque-transmitting mechanism 250. The planet carrier assembly members 226 and 236 are selectively connectible with the input shaft 17 and the sun gear member 242 through the torque-transmitting mechanism 252. The planet carrier assembly member 246 is selectively connectible with ring gear member 224 through the torque-transmitting mechanism 254. The interconnecting member 272 is selectively connectible with the housing 60 through the torque-transmitting mechanism 258. The sun gear members 222 and 232 are selectively connectible with the transmission housing 60 through the torque-transmitting mechanism 256.

The input shaft 17 and therefore sun gear member 242 rotate in unison at the speed of the input shaft 17, as do the interconnecting members 270 and 272 when the torque-transmitting mechanisms 250 and 252, respectively, are engaged. The planet carrier assembly member 246 rotates at a speed reduced from the speed of the input shaft 17, as does the ring gear member 224 when the torque-transmitting mechanism 254 is engaged. The speed of the planet carrier assembly member 246 is reduced in accordance with the ring gear/sun gear tooth ratio of the planetary gearset 240.

The truth table of FIG. 6 provides an engagement sequence and combination for the torque-transmitting mechanisms to establish a reverse speed ratio and six forward speed ratios between the input shaft 17 and the output shaft 19 through the planetary gear arrangement 218.

The reverse speed ratio is established with the engagement of the torque-transmitting mechanisms 250 and 258. During the reverse speed ratio, the sun gear member 232 is driven at the speed of the input shaft 17, and the ring gear member 234 and therefore output shaft 19 are driven at a speed determined by the speed of the sun gear member 232 and the ring gear/sun gear tooth ratio of the planetary gearset 230. The numerical value of the reverse speed ratio is determined by the ring gear/sun gear tooth ratio of the planetary gearset 230.

The first forward speed ratio is established with the engagement of the torque-transmitting mechanisms 254 and 258. During the first forward speed ratio, the ring gear member 224 is driven at a speed equal to the speed of the planet carrier assembly member 246, and the planet carrier assembly members 226 and 236 are held stationary. The sun gear members 222 and 232 are driven at a speed determined by the speed of the ring gear member 224 and the ring gear/sun gear tooth ratio of the planetary gearset 220. The ring gear member 234 is driven at a speed determined by the speed of the sun gear member 232 and the ring gear/sun gear tooth ratio of the planetary gearset 230. The numerical value of the first forward speed ratio is determined by the ring gear/sun gear tooth ratios of all three planetary gearsets 220, 230, and 240.

The second forward speed ratio is established with the engagement of the torque-transmitting mechanisms 254 and 256. During the second forward speed ratio, the ring gear member 224 is driven at the reduced speed of the planet carrier assembly member 246. The planet carrier assembly members 226 and 236 are driven at a speed determined by the speed of the ring gear member 224 and the ring gear/sun gear tooth ratio of the planetary gearset 220. The ring gear member 234 and therefore output shaft 19 are driven at a speed determined by the speed of the planet carrier assembly member 236 and the ring gear/sun gear tooth ratio of the planetary gearset 230. The numerical value of the second forward speed ratio is determined by the ring gear/sun gear tooth ratios of all three planetary gearsets 220, 230, and 240.

The third forward speed ratio is established with the engagement of the torque-transmitting mechanisms 250 and 254. During the third forward speed ratio, the ring gear member 224 is driven at the reduced speed of the planet carrier assembly member 246, and the sun gear members 222 and 232 are driven at the speed of the input shaft 17. The planet carrier assembly members 226 and 236 are driven at a speed determined by the speed of the sun gear member 222, the speed of the ring gear member 224, and the ring gear/sun gear tooth ratio of the planetary gearset 220. The ring gear member 234 and therefore output shaft 19 are driven at a speed determined by the speed of the sun gear member 232, the speed of the planet carrier assembly member 236, and the ring gear/sun gear tooth ratio of the planetary gearset 230. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 252 and 254. During the fourth forward speed ratio, the ring gear member 224 is driven at the reduced speed of the planet carrier assembly member 246, and the planet carrier assembly members 226 and 236 are driven at the speed of the input shaft 17. The sun gear members 222 and 232 are driven at a speed determined by the speed of the planet carrier assembly member 226, the speed of the ring gear member 224, and the ring gear/sun gear tooth ratio of the planetary gearset 220. The ring gear member 234 is driven at a speed determined by the speed of the sun gear member 232, the speed of the planet carrier assembly member 236, and the ring gear/sun gear tooth ratio of the planetary gearset 230. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250 and 252. The numerical value of the fifth forward speed ratio is unity since the members of the planetary gearsets 220 and 230 rotate in unison.

The sixth forward speed ratio is established with the engagement of the torque-transmitting mechanisms 252 and 256. During the sixth forward speed ratio, the planet carrier assembly member 236 is driven at the speed of the input shaft 17 and the sun gear member 232 is held stationary. The ring gear member 234 and therefore output shaft 19 rotate at a speed determined by the speed of the planet carrier assembly member 236 and the ring gear/sun gear tooth ratio of the planetary gearset 230. The numerical value of the sixth forward speed ratio is determined by the ring gear/sun gear tooth ratio of the planetary gearset 230.

The truth table of FIG. 6 and the chart found therein, provide a numerical example of the speed ratios for the planetary gear arrangement 218 and the value of the ratio steps between adjacent forward speed ratios as well as between the reverse and first forward speed ratio. These numerical values are determined utilizing the sample ring gear/sun gear tooth ratios given in FIG. 6 and represented as R1/S1, R2/S2, and R3/S3 that are the ring gear/sun gear tooth ratios for the planetary gearsets 220, 230, and 240, respectively.

Figures 7, 8:
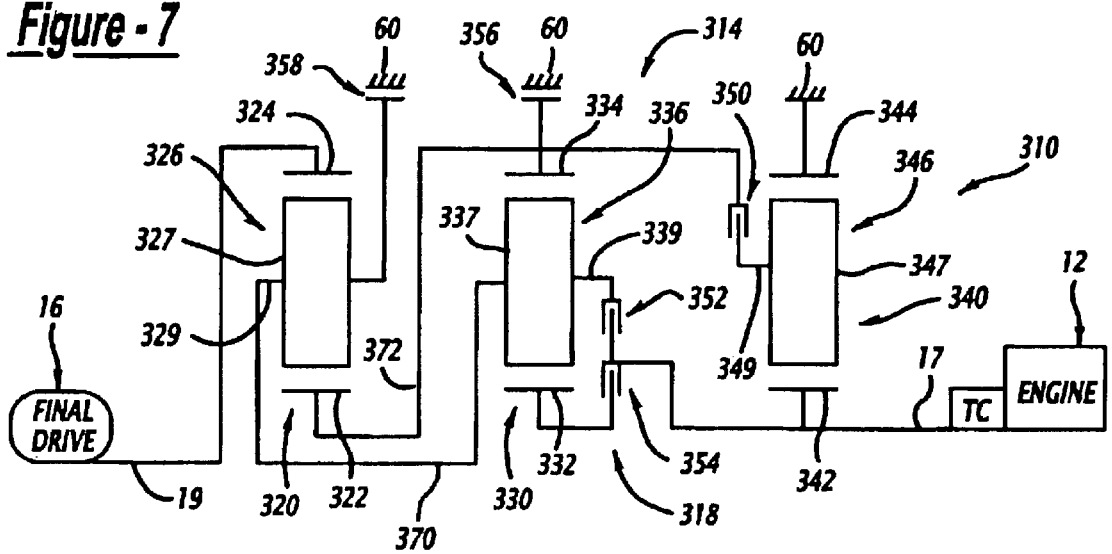
FIG. 7 is a schematic representation of a powertrain employing another family member incorporating the present invention.
FIG. 8 is a truth table and chart providing the engagement combination with the torque-transmitting mechanisms as well as speed ratio values of the family member shown in FIG. 7.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340. The planetary gear arrangement 318 also includes three rotatable torque-transmitting mechanisms 350, 352, and 354, and two stationary torque-transmitting mechanisms 356 and 358.

The planetary gearset 320 includes a sun gear member 322, a ring gear member 324, and a planet carrier assembly member 326 having a variety of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 has a plurality of pinion gears 337 rotatably mounted on a planet carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 has a plurality of pinion gears 347 that are rotatably mounted on a carrier 349 and disposed in meshing relationship with the sun gear member 342 and the ring gear member 344.

The planet carrier assembly member 326 and planet carrier assembly member 336 are continuously interconnected by an interconnecting member 370. The sun gear member 322 and ring gear member 334 are continuously interconnected through an interconnecting member 372 which is also selectively connectible with the planet carrier assembly member 346 through the torque-transmitting mechanism 350. The ring gear member 344 is continuously connected with the transmission housing 60. The sun gear member 342 is continuously connected with the input shaft 17, which is selectively connectible with the sun gear member 332 through the torque-transmitting mechanism 354, and selectively connectible with the interconnecting member 370 through the torque-transmitting mechanism 352. The interconnecting member 370 is selectively connectible with the transmission housing 60 through the torque-transmitting mechanism 358. The interconnecting member 372 is selectively connectible with the transmission housing 60 through the torque-transmitting mechanism 356.

It should be noted that the sun gear member 332 is not continuously interconnected with any of the other transmission components but is selectively connectible with the input shaft 17 through the torque-transmitting mechanism 354.

The truth table, shown in FIG. 8, describes the engagement sequence and combinations for the torque-transmitting mechanisms in order to provide six forward speed ratios and one reverse speed ratio between the input shaft 17 and the output shaft 19 through the planetary gear arrangement 318.

The reverse speed ratio is established with the engagement of the torque-transmitting mechanisms 350 and 358. During the reverse speed ratio, the sun gear member 322 is driven in unison with the planet carrier assembly member 346. The ring gear member 324 and therefore output shaft 19 are driven at a speed determined by the speed of the sun gear member 322 and the ring gear/sun gear tooth ratio of the planetary gearset 320. The numerical value of the reverse speed ratio is determined by the ring gear/sun gear tooth ratios of the planetary gearsets 320 and 340.

The first forward speed ratio is established with the engagement of the torque-transmitting mechanisms 354 and 358. During the first forward speed ratio, the sun gear member 332 is driven with the input shaft 17. The sun gear member 322 and the ring gear member 334 are driven at a speed determined by the speed of the sun gear member 332 and the ring gear/sun gear tooth ratio of the planetary gearset 330. The ring gear member 324 and therefore output shaft 19 are driven at a speed determined by the speed of the sun gear member 322 and the ring gear/sun gear tooth ratio of the planetary gearset 320. The numerical value of the first forward speed ratio is determined by the ring gear/sun gear tooth ratios of the planetary gearsets 320 and 330.

The second forward speed ratio is established with the engagement of the torque transmitting mechanisms 354 and 356. During the second forward speed ratio, the planet carrier assembly member 336 and the planet carrier assembly member 326 are driven at a speed determined by the speed of the sun gear member 332 (input speed) and the tooth ratio of the planetary gearset 330. The ring gear member 324 and therefore the output shaft 19 are driven at a speed determined by the speed of the planet carrier assembly member 326 and the tooth ratio of the planetary gearset 320. The numerical value of the second forward speed ratio is determined by the ring gear/sun gear tooth ratios of the planetary gearset 320 and 330.

The third forward speed ratio is established with the engagement of the torque-transmitting mechanisms 350 and 354. During the third forward speed ratio, the ring gear member 334 and sun gear member 322 are driven in unison with the planet carrier assembly member 346 which is driven at a reduced speed ratio from the input shaft 17 driven by the ring gear/sun gear tooth ratio of the planetary gearset 340. The sun gear member 332 is driven by the input shaft 17. The planet carrier assembly members 336 and 326 are driven at a speed determined by the speed of the sun gear member 332, the speed of the ring gear member 334, and the ring gear/sun gear tooth ratio of the planetary gearset 330. The ring gear member 324 and therefore output shaft 19 are driven at a speed determined by the speed of the sun gear member 322, the speed of the planet carrier assembly member 326, and the ring gear/sun gear tooth ratio of the planetary gearset 320. The numerical value of the third forward speed ratio is determined by the ring gear/sun gear tooth ratios of the all three planetary gearsets 320, 330, and 340.

The fourth forward speed ratio is established with the engagement of the torque-transmitting mechanisms 352 and 354. With the engagement of these two torque-transmitting mechanisms, the planetary gearsets 320 and 330 rotate in unison with the input shaft 17 and the output shaft 19, such that the numerical value of the fourth forward speed ratio is one.

The fifth forward speed ratio is established with the engagement of the torque-transmitting mechanisms 350 and 352. During the fifth forward speed ratio, the sun gear member 322 is driven forwardly at the reduced speed of the sun gear member 342. The ring gear member 324 and therefore output shaft 19 are driven forwardly at a speed determined by the speed of the sun gear member 322, the speed of the planet carrier assembly member 326, and the ring gear/sun gear tooth ratio of the planetary gearset 320. The numerical value of the fifth forward speed ratio is determined by the ring gear/sun gear tooth ratios of the planetary gearsets 320 and 340.

The sixth forward speed ratio is established with the engagement of the torque-transmitting mechanisms 352 and 356. During the sixth forward speed ratio, the planet carrier assembly member 326 is driven at the speed of the input shaft 17. The sun gear member 322 is held stationary, and the ring gear member 324 and therefore output shaft 19 are driven at a speed determined by the speed of the planet carrier assembly member 326 and the ring gear/sun gear tooth ratio of the planetary gearset 320. The numerical value of the sixth forward speed ratio is determined by the ring gear/sun gear tooth ratio of the planetary gearset 320.

As seen in FIG. 8, the truth table and chart provide numerical examples for the speed ratios found within the planetary gear arrangement 318, as well as the numerical values for the ratio steps between adjacent forward speed ratios and the reverse-to first-forward speed ratio. These numerical values are determined from the ring gear/sun gear tooth ratios of the planetary gearsets 320, 330, and 340, as represented by the R1/S1, R2/S2, and R3/S3 values, respectively.

Figures 9, 10:
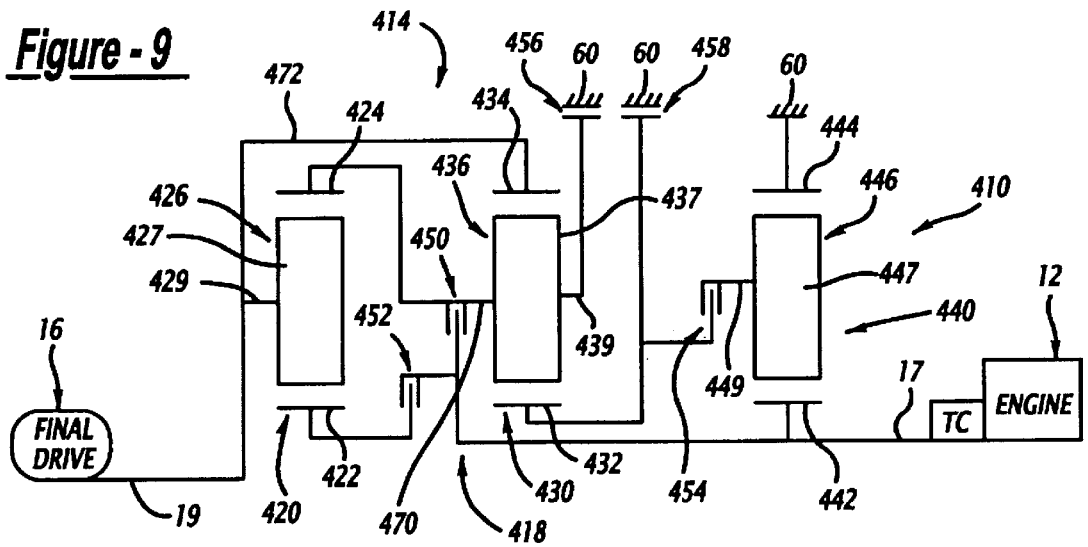
FIG. 9 is a schematic representation of a powertrain employing another family member incorporating the present invention.
FIG. 10 is a truth table and chart providing the engagement combination with the torque-transmitting mechanisms as well as speed ratio values of the family member shown in FIG. 9.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440. The planetary gear arrangement 418 also includes three rotatable torque-transmitting mechanisms 450, 452, and 454, and two stationary torque-transmitting mechanisms 456 and 458.

The planetary gearset 420 includes a sun gear member 422, a ring gear member 424, and a planet carrier assembly member 426 having a variety of pinion gears 427 rotatably mounted on a planet carrier 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 has a plurality of pinion gears 437 rotatably mounted on a planet carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 has a plurality of pinion gears 447 that are rotatably mounted on a carrier 449 and disposed in meshing relationship with the sun gear member 442 and the ring gear member 444.

The ring gear member 424 and planet carrier assembly member 436 are continuously interconnected by an interconnecting member 470 and selectively connectible with the input shaft 17 through the torque-transmitting mechanism 450. The ring gear member 434 and planet carrier assembly member 426 are continuously interconnected by an interconnecting member 472, which is continuously connected with the output shaft 19. The input shaft 17 is continuously connected with the sun gear member 442 and selectively connectible with the sun gear member 422 through the torque-transmitting mechanism 452. The ring gear member 444 is continuously connected with the transmission housing 60. The planet carrier assembly member 446, which rotates at a reduced speed relative to the input shaft 17, is selectively connectible with the sun gear member 432 through the torque-transmitting mechanism 454. The sun gear member 432 is selectively connectible with the transmission housing 60 through the torque-transmitting mechanism 458, and the interconnecting member 470 is selectively connectible with the transmission housing 60 through the torque-transmitting mechanism 456.

It should be noted that the sun gear member 422 and the sun gear member 432 are not continuously interconnected with other members of the planetary gear arrangement 418, but are selectively connectible with other components through the judicious selection of the torque-transmitting mechanism 452 for the sun gear member 422, and the torque-transmitting mechanisms 454 and 458 for the sun gear member 432.

The torque-transmitting mechanisms are engaged in combinations of two as shown in the truth table of FIG. 10 to provide the six forward speed ratios and one reverse speed ratio through the planetary gear arrangement 418 between the input shaft 17 and the output shaft 19.

The reverse speed ratio is established with the engagement of the torque-transmitting mechanisms 454 and 456. The sun gear member 432 is driven at a reduced speed determined by the input speed and the ring gear/sun gear tooth ratio of the planetary gearset 440. The ring gear member 434 and therefore output shaft 19 are driven at a speed determined by the speed of the sun gear member 432 and the ring gear/sun gear tooth ratio of the planetary gearset 430. The numerical value of the reverse speed ratio is determined by the ring gear/sun gear tooth ratios of the planetary gearsets 420 and 430.

The first forward speed ratio is established with the engagement of the torque-transmitting mechanisms 456 and 452. The sun gear member 422 is driven by the input shaft 17, and the ring gear member 424 is held stationary. The planet carrier assembly member 426 and therefore output shaft 19 are driven forwardly at a speed determined by the speed of the sun gear member 422 and the ring gear/sun gear tooth ratio of the planetary gearset 420. The numerical value of the first forward speed ratio is determined by the ring gear/sun gear tooth ratio of the planetary gearset 420.

The second forward speed ratio is established with the engagement of the torque-transmitting mechanisms 452 and 458. During the second forward speed ratio, the ring gear member 424 and planet carrier assembly member 436 are driven at a speed determined by the speed of the sun gear member 422 and the speed of the planet carrier assembly member 426. The ring gear member 434 and therefore output shaft 19 are driven at a speed determined by the speed of the planet carrier assembly member 436 and the ring gear/sun gear tooth ratio of the planetary gearset 430. The numerical value of the second forward speed ratio is determined by the ring gear/sun gear tooth ratios of the planetary gearsets 420 and 430.

The third forward speed ratio is established with the engagement of the torque-transmitting mechanisms 452 and 454. During the third forward speed ratio, the sun gear member 432 is driven at the reduced speed of the planet carrier assembly member 446, and the sun gear member 422 is driven at the speed of the input shaft 17. The ring gear member 424 and planet carrier assembly member 436 are driven at a speed determined by the speed of sun gear member 422, the speed of the planet carrier assembly member 426, and the ring gear/sun gear tooth ratio of the planetary gearset 420. The ring gear member 434 and therefore output shaft 19 are driven at a speed determined by the speed of the planet carrier assembly member 436, the speed of the sun gear member 432, and the ring gear/sun gear tooth ratio of the planetary gearset 430. The numerical value of the third forward speed ratio is determined by the ring gear/sun gear tooth ratios of all three planetary gearsets 420, 430, and 440.

The fourth speed ratio is established with the engagement of the torque transmitting mechanisms 450 and 452. This combination effectively connects the input shaft 17 directly with the output shaft 19 through the planetary gearset 420. The fourth forward speed ratio is a direct drive having a numerical value of one.

The fifth forward speed ratio is established with the engagement of the torque-transmitting mechanisms 450 and 454. During the fifth forward speed ratio, the sun gear member 432 is driven at the reduced speed of the planet carrier assembly member 446, and the planet carrier assembly member 436 is driven at the speed of the input shaft 17. The ring gear member 434 and therefore output shaft 19 are driven at the speed determined by the speed of the sun gear member 432, the speed of the planet carrier assembly member 436, and the ring gear/sun gear tooth ratio of the planetary gearset 430. The numerical value of the fifth forward speed ratio is determined by the ring gear/sun gear tooth ratios of the planetary gearsets 430 and 440.

The sixth forward speed ratio is established with the engagement of the torque-transmitting mechanisms 450 and 458. During the sixth forward speed ratio, the planet carrier assembly member 436 is driven by the input shaft 17, and the sun gear member 432 is held stationary. The ring gear member 434 and therefore output shaft 19 are driven at a speed determined by the speed of the planet carrier assembly member 436 and the ring gear/sun gear tooth ratio of the planetary gearset 430. The numerical value of the sixth forward speed ratio is determined by the ring gear/sun gear tooth ratio of the planetary gearset 430.

The truth table and chart of FIG. 10 provides a numerical example of the speed ratios of the planetary gear arrangement 418, as well as the ratio steps between adjacent forward speed ratios and between the reverse and first forward speed ratio. These numerical values are established from the ring gear/sun gear tooth ratios of the planetary gearsets 420, 430, and 440, as represented by the ratios R1/S1, R2/S2, and R3/S3, respectively.

Figures 11, 12:
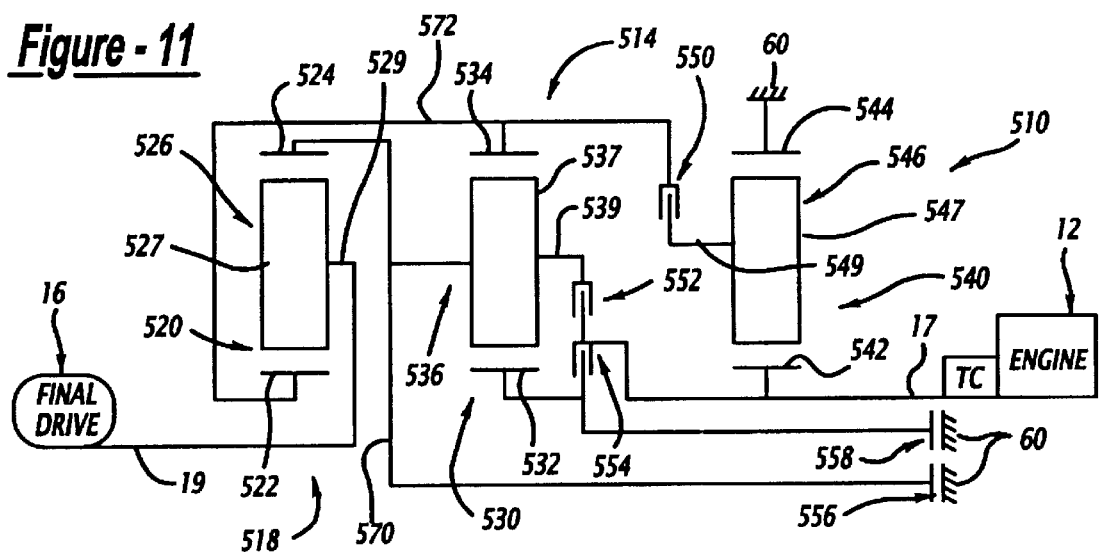
FIG. 11 is a schematic representation of a powertrain employing another family member incorporating the present invention.
FIG. 12 is a truth table and chart providing the engagement combination with the torque-transmitting mechanisms as well as speed ratio values of the family member shown in FIG. 1.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540. The planetary gear arrangement 518 also includes three rotatable torque-transmitting mechanisms 550, 552, and 554, and two stationary torque-transmitting mechanisms 556 and 558.

The planetary gearset 520 includes a sun gear member 522, a ring gear member 524, and a planet carrier assembly member 526 having a variety of pinion gears 527 rotatably mounted on a planet carrier 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 has a plurality of pinion gears 537 rotatably mounted on a planet carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 has a plurality of pinion gears 547 that are rotatably mounted on a carrier 549 and disposed in meshing relationship with the sun gear member 542 and the ring gear member 544.

The ring gear member 524 and planet carrier assembly member 536 are continuously interconnected by an interconnecting member 570 which is selectively connectible with the transmission housing 60 through the torque-transmitting mechanism 556. The sun gear member 522 and ring gear member 534 are continuously interconnected by an interconnecting member 572, which is also selectively connectible with the planet carrier assembly member 546 through the torque transmitting mechanism 550. The input shaft 17 is continuously connected with the sun gear member 542 and selectively connectible with the sun gear member 532 through the torque-transmitting mechanism 554, and selectively connectible with the interconnecting member 570 through the torque-transmitting mechanism 552. The ring gear member 544 is continuously connected with the transmission housing 60. The sun gear member 532 is selectively connectible with the transmission housing 60 through the torque-transmitting mechanism 558.

As with the family members described above, the planet carrier assembly member 546 rotates at a reduced speed relative to the input shaft 17 as determined by the ring gear/sun gear tooth ratio of the planetary gearset 540. The sun gear member 532 is noncontinuously connected with other members of the planetary gear arrangement 518, but is selectively connectible with components through the torque-transmitting mechanism 554 and the torque-transmitting mechanism 558.

The truth table in FIG. 12 describes the engagement combinations and sequence of engagements for the torque-transmitting mechanisms to provide six forward speed ratios and one reverse speed ratio through the planetary gear arrangement 518 between the input shaft 17 and the output shaft 19.

The reverse speed ratio is established with the engagement of the torque-transmitting mechanisms 554 and 556. During the reverse speed ratio, the sun gear member 532 is driven at the speed of the input shaft 17. The ring gear member 534 and sun gear member 522 are driven at a speed determined by the speed of the sun gear member 532 and the ring gear/sun gear tooth ratio of the planetary gearset 530. The planet carrier assembly member 526 and therefore output shaft 19 are driven at a speed determined by the speed of the sun gear member 522 and the ring gear/sun gear tooth ratio of the planetary gearset 520. The numerical value of the reverse speed ratio is determined by the ring gear/sun gear tooth ratios of the planetary gearsets 520 and 530.

The first forward speed ratio is established with the engagement of the torque-transmitting mechanisms 550 and 556. During the first forward speed ratio, the sun gear member 522 rotates at the reduced speed of the planet carrier assembly member 546. The planet carrier assembly member 526 and therefore output shaft 19 rotate at a speed determined by the speed of the sun gear member 522 and the ring gear/sun gear tooth ratio of the planetary gearset 520. The numerical value of the first forward speed ratio is determined by the ring gear/sun gear tooth ratios of the planetary gearsets 520 and 540.

The second forward speed ratio is established with the engagement of the torque-transmitting mechanisms 550 and 558. During the second forward speed ratio, the ring gear member 534 and sun gear member 522 are driven at the reduced speed of the planet carrier assembly member 546. The planet carrier assembly member 536 and ring gear member 524 rotate at a speed determined by the speed of the ring gear member 534 and the ring gear/sun gear tooth ratio of the planetary gearset 530. The planet carrier assembly member 526 and therefore the output shaft 19 rotate at a speed determined by the speed of the sun gear member 522, the speed of the ring gear member 524, and the ring gear/sun gear tooth ratio of the planetary gearset 520. The numerical value of the second forward speed ratio is determined by the numerical values of the ring gear/sun gear tooth ratios of all three planetary gearsets 520, 530, and 530.

The third forward speed ratio is established with the engagement of the torque-transmitting mechanisms 550 and 554. During the third forward speed ratio, the ring gear member 534 and the sun gear member 522 are driven at the reduced speed of the planet carrier member 546. The planet carrier assembly member 536 and ring gear member 524 are driven at a speed determined by the speed of the sun gear member 532, the speed of the ring gear member 534, and the ring gear/sun gear tooth ratio of the planetary gearset 530. The planet carrier assembly member 526 and therefore output shaft 19 are driven at a speed determined by the speed of the ring gear member 524, the speed of the sun gear member 522, and the ring gear/sun gear tooth ratio of the planetary gearset 520. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550 and 552. During the fourth forward speed ratio, the planet carrier assembly member 526 and therefore output shaft 19 are driven at a speed determined by the speed of ring gear member 524 (input), the speed of the sun gear member 522 (reduced), and the ring gear/sun gear tooth ratio of the planetary gearset 520. The numerical value of the fourth forward speed ratio is determined by the ring gear/sun gear tooth ratios of the planetary gearsets 520 and 540.

The fifth forward speed ratio is established with the engagement of the torque-transmitting mechanisms 552 and 554. This combination of engagements of torque-transmitting mechanisms induces the 1:1 rotation between the input shaft 17 and the output shaft 19. The numerical value of the fifth forward speed ratio is therefore one.

The sixth forward speed ratio is established with the engagement of the torque-transmitting mechanisms 552 and 558. During the sixth forward speed ratio, the planet carrier assembly member 536 and ring gear member 524 are driven by the input shaft 17. The ring gear member 534 and sun gear member 522 are rotated at a speed determined by the speed of the planet carrier assembly member 536 and the ring gear/sun gear tooth ratio of the planetary gearset 530. The planet carrier assembly member 526 and therefore output shaft 19 are rotated at a speed determined by the speed of ring gear member 524, the speed of the sun gear member 522, and the ring gear/sun gear tooth ratio of the planetary gearset 520. The numerical value of the sixth forward speed ratio is determined by the ring gear/sun gear tooth ratios of the planetary gearsets 520 and 530.

The truth table and chart of FIG. 12 give an example of numerical values for ring gear/sun gear tooth ratios that are possible with the planetary gear arrangement 518, as well as the numerical values for the ratio steps between adjacent forward speed ratios, and between the reverse and first forward speed ratio. These numerical values are determined using the ring gear/sun gear tooth ratios of the planetary gearsets 520, 530, and 540 as represented by the ratios R1/S1, R2/S2, and R3/S3, respectively.

Figures 13, 14:
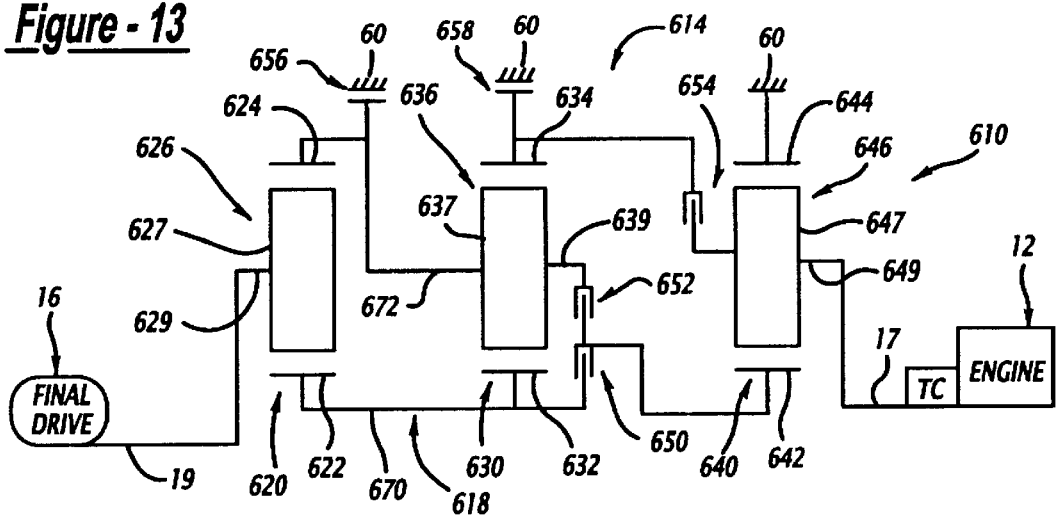
FIG. 13 is a schematic representation of a powertrain employing another family member incorporating the present invention.
FIG. 14 is a truth table and chart providing the engagement combination with the torque-transmitting mechanisms as well as speed ratio values of the family member shown in FIG. 13.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640. The planetary gear arrangement 618 also includes three rotatable torque-transmitting mechanisms 650, 652, and 654, and two stationary torque-transmitting mechanisms 656 and 658.

The planetary gearset 620 includes a sun gear member 622, a ring gear member 624, and a planet carrier assembly member 626 having a variety of pinion gears 627 rotatably mounted on a planet carrier 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 has a plurality of pinion gears 637 rotatably mounted on a planet carrier 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 has a plurality of pinion gears 647 that are rotatably mounted on a carrier 649 and disposed in meshing relationship with the sun gear member 642 and the ring gear member 644.

The sun gear members 622 and 632 are continuously interconnected by an interconnecting member 670. The ring gear member 624 and planet carrier assembly member 636 are continuously interconnected by an interconnecting member 672. The input shaft 17 is continuously connected with the planet carrier assembly member 646 and selectively connectible with the ring gear member 634 through the torque-transmitting mechanism 654. The ring gear member 644 is continuously connected with the transmission housing 60. The output shaft 19 is continuously connected with the planet carrier assembly member 626. The sun gear member 642 is selectively connectible with the interconnecting member 670 through the torque-transmitting mechanism 650, and selectively connectible with the interconnecting member 672 through the torque-transmitting mechanism 652. The interconnecting member 672 is selectively connectible with the transmission housing 60 through the torque-transmitting mechanism 656. The ring gear member 634 is selectively connectible with the transmission housing 60 through the torque-transmitting mechanism 658. The ring gear member 634 is not normally continuously connected with any other of the elements of the planetary gear arrangement 618.

It should be noted that the sun gear member 642 is rotated at a speed faster than the speed of the input shaft 17. The ratio between the planet carrier assembly member 646 and the sun gear member 642 is determined by the ring gear/sun gear tooth ratio of the planetary gearset 640. Whenever the torque-transmitting mechanisms 650 and 652 are engaged, the interconnecting member 670 and interconnecting member 672, respectively, will rotate faster than the input shaft 17.

The truth table shown in FIG. 14 describes the combination of engagements and the sequence of engagements for the torque-transmitting mechanisms in order to establish six forward speed ratios and one reverse speed ratio between the input shaft 17 and the output shaft 19 through the planetary gear arrangement 618.

Those skilled in the art will recognize that the numerical value of the reverse speed ratio is determined by the ring gear/sun gear tooth ratios of the planetary gearsets 620 and 630. The numerical value for the first forward speed ratio is determined utilizing the ring gear/sun gear tooth ratios of the planetary gearsets 620 and 640. The numerical values for the second, third, fifth, and sixth forward speed ratios are determined by the ring gear/sun gear tooth ratios of all three planetary gearsets 620, 630, and 640. The fourth forward speed ratio has a numerical value determined by the ring gear/sun gear tooth ratio planetary gearset 640.

The table and chart of FIG. 14 provide numerical values as examples of the ratios that are possible within the planetary gear arrangement 618 when utilizing the ring gear/sun gear tooth ratios of the planetary gearsets 620, 630, and 640, as represented by the ring gear/sun gear tooth ratios R1/S1, R2/S2, and R3/S3, respectively.

Figures 15, 16:
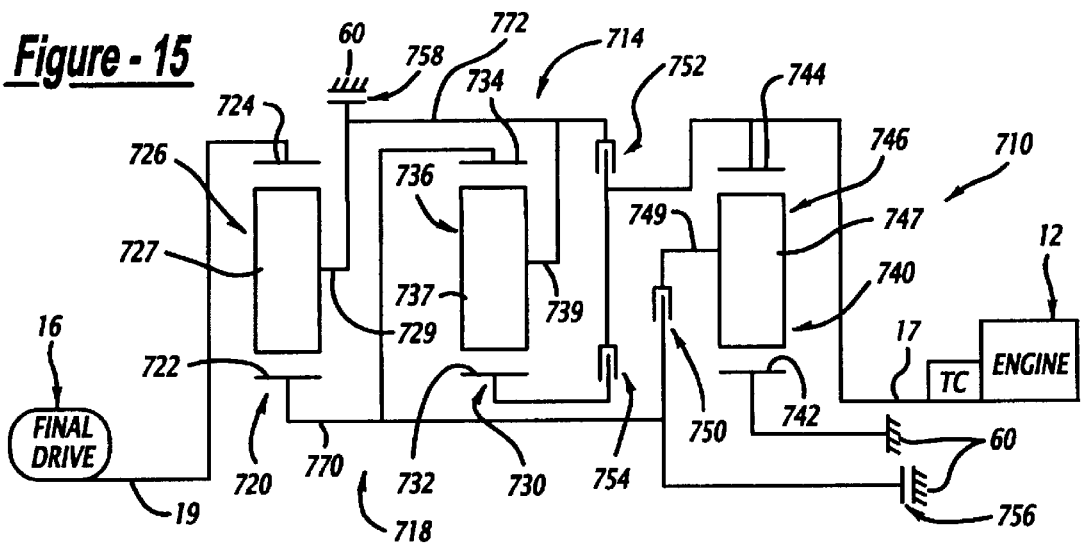
FIG. 15 is a schematic representation of a powertrain employing another family member incorporating the present invention.
FIG. 16 is a truth table and chart providing the engagement combination with the torque-transmitting mechanisms as well as speed ratio values of the family member shown in FIG. 15.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740. The planetary gear arrangement 718 also includes three rotatable torque-transmitting mechanisms 750, 752, and 754, and two stationary torque-transmitting mechanisms 756 and 758.

The planetary gearset 720 includes a sun gear member 722, a ring gear member 724, and a planet carrier assembly member 726 having a variety of pinion gears 727 rotatably mounted on a planet carrier 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 has a plurality of pinion gears 737 rotatably mounted on a planet carrier 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 has a plurality of pinion gears 747 that are rotatably mounted on a carrier 749 and disposed in meshing relationship with the sun gear member 742 and the ring gear member 744.

The sun gear member 722 and ring gear member 734 are continuously interconnected by an interconnecting member 770, which is selectively connectible with the planet carrier assembly member 746 through the torque-transmitting mechanism 750, and with the transmission housing 60 through the torque-transmitting mechanism 756. The planet carrier assembly member 726 and planet carrier assembly member 736 are continuously interconnected by an interconnecting member 772, which is selectively connectible with the input shaft 17 through the torque-transmitting mechanism 752, and selectively connectible with the transmission housing 60 through the torque-transmitting mechanism 758. The input shaft 17 is continuously connected with the ring gear member 744 and selectively connectible with the sun gear member 732 through the torque-transmitting mechanism 754. The sun gear member 742 is continuously connected with the transmission housing 60.

The truth table and chart of FIG. 16 defines the combination of engagements for the torque-transmitting mechanisms as well as the sequence of engagements for the torque-transmitting mechanisms in order to establish six forward speed ratios and one reverse speed ratio between the input shaft 17 and the output shaft 19 through the planetary gear arrangement 718. The truth table also provides an example of the numerical values for the ratios as well as the numerical values for the ratio steps between adjacent ratios. These numerical values are determined utilizing ring gear/sun gear tooth ratios of the planetary gearsets 720, 730, and 740, as represented by the ratios R1/S1, R2/S2, and R3/S3, respectively.

Those skilled in the art will recognize that the numerical value of the reverse speed ratio is determined by the ring gear/sun gear tooth ratios of the planetary gearsets 720 and 740. The numerical values of the first and second forward speed ratios are determined utilizing the ring gear/sun gear tooth ratios of the planetary gearsets 720 and 730. The numerical value of the third forward speed ratio is determined utilizing the ring gear/sun gear tooth ratios of all three planetary gearsets 720, 730, and 740. The fourth forward speed ratio has a numerical value of one. The numerical value of the fifth forward speed ratio is determined utilizing the ring gear/sun gear tooth ratios of the planetary gearsets 720 and 740. The numerical value of the sixth forward speed ratio is determined utilizing the ring gear/sun gear tooth ratio of the planetary gearset 720.

Figures 17, 18:
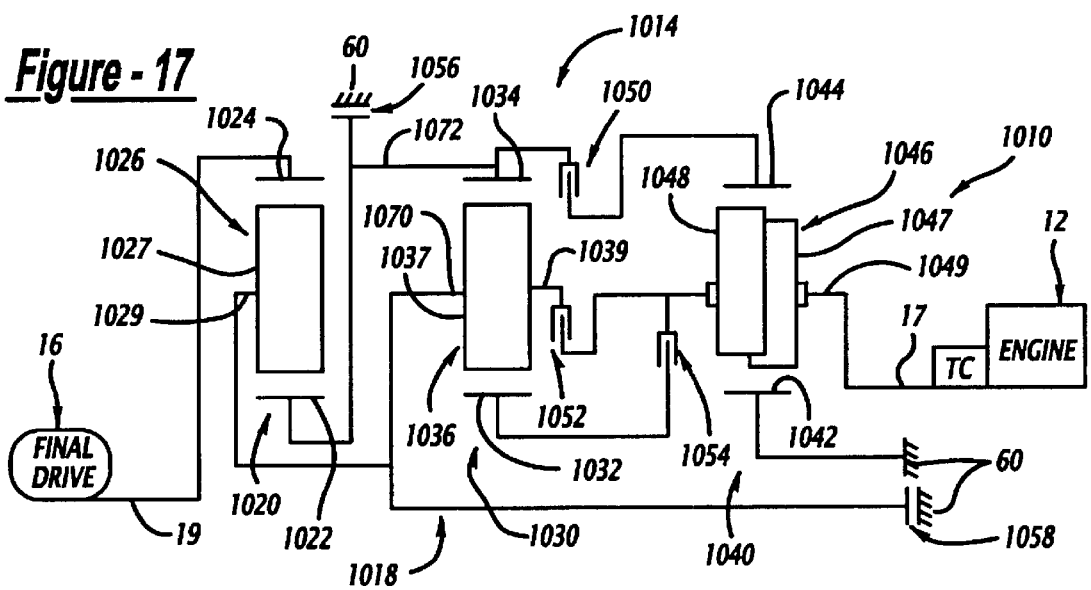
FIG. 17 is a schematic representation of a powertrain employing another family member incorporating the present invention.
FIG. 18 is a truth table and chart providing the engagement combination with the torque-transmitting mechanisms as well as speed ratio values of the family member shown in FIG. 17.

A powertrain 1010, shown in FIG. 17, includes the engine and torque converter 12, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040. The planetary gear arrangement 1018 also includes three rotatable torque-transmitting mechanisms 1050, 1052, and 1054, and two stationary torque-transmitting mechanisms 1056 and 1058.

The planetary gearset 1020 includes a sun gear member 1022, a ring gear member 1024, and a planet carrier assembly member 1026 having a variety of pinion gears 1027 rotatably mounted on a planet carrier 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 has a plurality of pinion gears 1037 rotatably mounted on a planet carrier 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of intermeshing pinion gears 1047 and 1048 that are rotatably mounted on a carrier 1049 and disposed in meshing relationship with the sun gear member 1042 and the ring gear member 1044.

The planet carrier assembly member 1026 is continuously connected with the planet carrier assembly member 1036 through an interconnecting member 1070. The sun gear member 1022 and ring gear member 1034 are continuously interconnected by an interconnecting member 1072. The input shaft 17 is continuously connected with the planet carrier assembly member 1046. The sun gear member 1042 is continuously interconnected with the transmission housing 60. The output shaft 19 is continuously interconnected with the ring gear member 1024. The input shaft 17 is selectively connectible with the sun gear member 1032 through the torque-transmitting mechanism 1054, and through the interconnecting member 1070 through the torque-transmitting mechanism 1052. The interconnecting member 1072 is selectively connectible with the ring gear member 1044 through the torque-transmitting mechanism 1050, and selectively connectible with the transmission housing 60 through the torque-transmitting mechanism 1056. The interconnecting member 1070 is selectively connectible through the transmission housing 60 through the torque-transmitting mechanism 1058.

It should be noted in the planetary gearset 1040 that the planet carrier assembly member 1046 is driven by the engine 12 and the ring gear member 1044 is driven at a reduced speed, the ratio to the input of which is determined by the ring gear/sun gear tooth ratio of the planetary gearset 1040. In other words, the planetary gearset 1040 provides an underdrive ratio.

The truth table of FIG. 18 describes the combinations of engagements for the torque-transmitting mechanisms, as well as the engagement sequence of the torque-transmitting mechanisms, to produce six forward speed ratios and one reverse speed ratio between the input shaft 17 and output shaft 19 through the planetary gear arrangement 1018. FIG. 18 also presents numerical examples of these ratios as well as numerical examples of the ratio steps between adjacent forward speed ratios and between the reverse and first forward speed ratios.

Those skilled in the art will recognize that the numerical value of the reverse speed ratio is determined by the ring gear/sun gear tooth ratios of the planetary gearsets 1020 and 1040. The numerical value of the first and second forward speed ratios is determined by the ring gear/sun gear tooth ratios of the planetary gearsets 1020 and 1030. The numerical value of the third forward speed ratio is determined by the ring gear/sun gear tooth ratios of all three planetary gearsets 1020, 1030, and 1040. The numerical value of the fourth forward speed ratio is one. The numerical value of the fifth forward speed ratio is determined by the ring gear/sun gear tooth ratios of the planetary gearsets 1020 and 1040. The numerical value of the sixth forward speed ratio is determined by the ring gear/sun gear tooth ratio of the planetary gearset 1020.

Figures 19, 20:
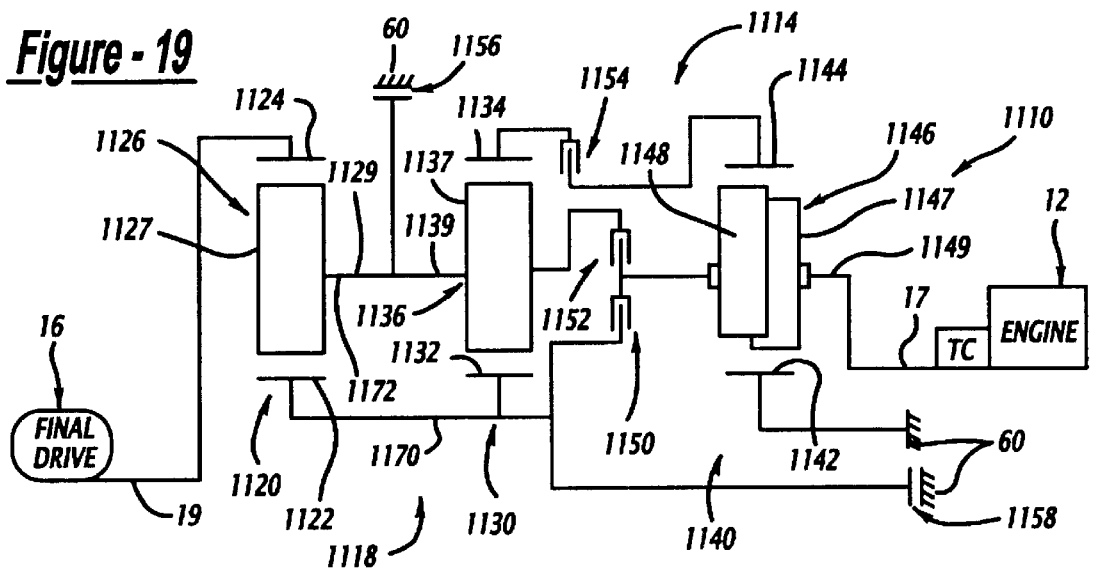
FIG. 19 is a schematic representation of a powertrain employing another family member incorporating the present invention.
FIG. 20 is a truth table and chart providing the engagement combination with the torque-transmitting mechanisms as well as speed ratio values of the family member shown in FIG. 19.

A powertrain 1110, shown in FIG. 19, includes the engine and torque converter 12, a planetary transmission 1114, and the final drive mechanism 16. The planetary transmission 1114 includes an input shaft 17, a planetary gear arrangement 1118, and the output shaft 19. The planetary gear arrangement 1118 includes three planetary gearsets 1120, 1130, and 1140. The planetary gear arrangement 1118 also includes three rotatable torque-transmitting mechanisms 1150, 1152, and 1154, and two stationary torque-transmitting mechanisms 1156 and 1158.

The planetary gearset 1120 includes a sun gear member 1122, a ring gear member 1124, and a planet carrier assembly member 1126 having a variety of pinion gears 1127 rotatably mounted on a planet carrier 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 has a plurality of pinion gears 1137 rotatably mounted on a planet carrier 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of intermeshing pinions 1147 and 1148 that are rotatably mounted on a carrier 1149 and disposed in meshing relationship with the sun gear member 1142 and ring gear member 1144, respectively.

The sun gear members 1122 and 1132 are continuously interconnected by an interconnecting member 1170. The planet carrier assembly members 1126 and 1136 are continuously interconnected by an interconnecting member 1172. The input shaft 17 is continuously connected with the planet carrier assembly member 1146, selectively connectible with the interconnecting member 1170 through the torque-transmitting mechanism 1150, and selectively connectible with the interconnecting member 1172 through the torque-transmitting mechanism 1152. The output shaft 19 is continuously connected with the ring gear member 1124. The sun gear member 1142 is continuously connected with the transmission housing 60. Ring gear member 1144 is selectively connectible with the ring gear member 1134 through the torque-transmitting mechanism 1154. The interconnecting member 1172 is selectively connectible with the transmission housing 60 through the torque-transmitting mechanism 1156. The interconnecting member 1170 is selectively connectible with the transmission housing 60 through the torque-transmitting mechanism 1158. It should be noted that the ring gear member 1134 is not continuously interconnected with any other of the elements of the planetary gear arrangement 1118.

FIG. 20 describes the engagement combinations, as well as the engagement sequence, for the torque-transmitting mechanisms in order to produce six forward speed ratios and one reverse speed ratio in the planetary gear arrangement 1118 between the input shaft 17 and the output shaft 19. FIG. 20 also provides numerical examples for these speed ratios, as well as numerical examples of the ratio steps between adjacent forward speed ratios and between the reverse and first forward speed ratio. The numerical values for the speed ratios have been determined utilizing the example ring gear/sun gear tooth ratios of the planetary gearsets 1120, 1130, and 1140 as represented by the ratios R1/S1, R2/S2, and R3/S3, respectively.

Those skilled in the art will recognize that the reverse speed ratio is determined by the ring gear/sun gear tooth ratio of the planetary gearset 1120. The numerical values of the first, second, third, and fourth forward speed ratios are determined utilizing the ring gear/sun gear tooth ratios of all three planetary gearsets 1120, 1130, and 1140. The fifth forward speed ratio has a numerical value of one. The numerical value of the sixth forward speed ratio is determined utilizing the ring gear/sun gear tooth ratio of the planetary gearset 1120.

Figures 21, 22:
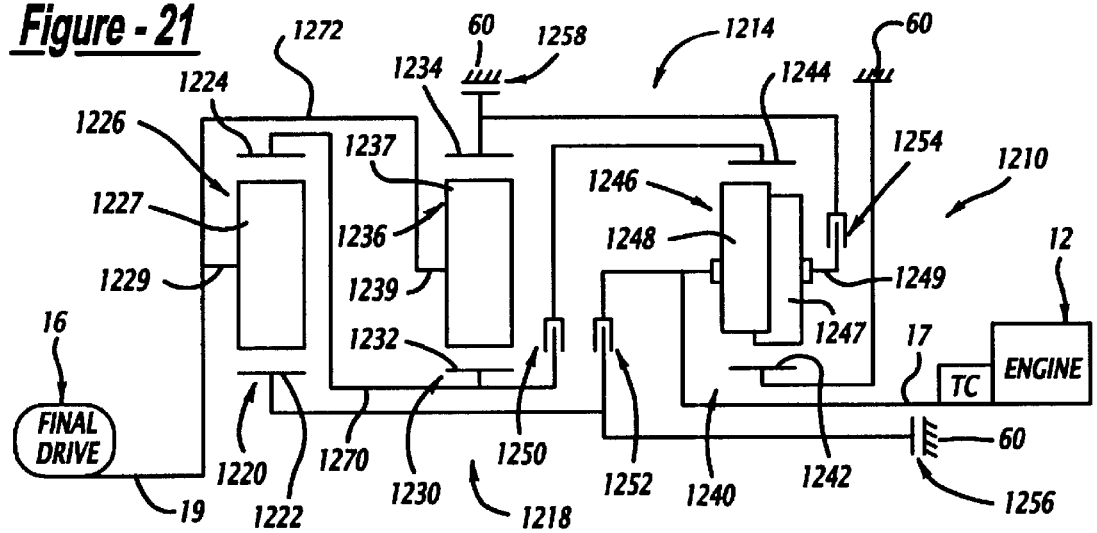
FIG. 21 is a schematic representation of a powertrain employing another family member incorporating the present invention.
FIG. 22 is a truth table and chart providing the engagement combination with the torque-transmitting mechanisms as well as speed ratio values of the family member shown in FIG. 21.

A powertrain 1210, shown in FIG. 21, includes the engine and torque converter 12, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240. The planetary gear arrangement 1218 also includes three rotatable torque-transmitting mechanisms 1250, 1252, and 1254, and two stationary torque-transmitting mechanisms 1256 and 1258.

The planetary gearset 1220 includes a sun gear member 1222, a ring gear member 1224, and a planet carrier assembly member 1226 having a variety of pinion gears 1227 rotatably mounted on a planet carrier 1229 and disposed in meshing relationship with both the sun gear member 1222 and the ring gear member 1224.

The planetary gearset 1230 includes a sun gear member 1232, a ring gear member 1234, and a planet carrier assembly member 1236. The planet carrier assembly member 1236 has a plurality of pinion gears 1237 rotatably mounted on a planet carrier 1239 and disposed in meshing relationship with both the sun gear member 1232 and the ring gear member 1234.

The planetary gearset 1240 includes a sun gear member 1242, a ring gear member 1244, and a planet carrier assembly member 1246. The planet carrier assembly member 1246 has a plurality of intermeshing pinions 1247 and 1248 that are rotatably mounted on a carrier 1249 and disposed in meshing relationship with the sun gear member 1242 and the ring gear member 1244, respectively.

The ring gear member 1224 and sun gear member 1232 are continuously interconnected by an interconnecting member 1270, and selectively connectible with the ring gear member 1244 through the torque-transmitting mechanism 1250. The planet carrier assembly member 1236, planet carrier assembly member 1226, and output shaft 19 are continuously interconnected by an interconnecting member 1272. The input shaft 17 is continuously connected with the planet carrier assembly member 1246, and selectively connectible with the sun gear member 1222 through the torque-transmitting mechanism 1252, and with the ring gear member 1234 through the torque-transmitting mechanism 1254. The sun gear member 1222 is selectively connectible with the transmission housing 60 through the torque-transmitting mechanism 1256. The ring gear member 1234 is selectively connectible with the transmission housing 60 through the torque-transmitting mechanism 1258. The ring gear member 1234 and sun gear member 1222 are not continuously interconnected with any of the other elements of the planetary gear arrangement 1218.

The truth table of FIG. 22 describes the combinations of engagements, as well as the engagement sequence, of the torque-transmitting mechanisms in order to produce six forward speed ratios and one reverse speed ratio between the input shaft 17 and the output shaft 19 through the planetary gear arrangement 1218. Also shown in FIG. 22 are examples of numerical values for the speed ratios as well as numerical values for the ratio steps between adjacent forward speed ratios and between the reverse and first forward speed ratio. These numerical values are determined utilizing the ring gear/sun gear tooth ratios of the planetary gearsets 1220, 1230, and 1240 as represented by the ratios R1/S1, R2/S2, and R3/S3, respectively.

Those skilled in the art will recognize that the numerical value of the reverse speed ratio is determined by the ring gear/sun gear tooth ratios of the planetary gearsets 1220 and 1230. The numerical value for the first forward speed ratio is determined by the ring gear/sun gear tooth ratios of the planetary gearsets 1230 and 1240. The numerical values for the second and third forward speed ratios are determined utilizing the ring gear/sun gear tooth ratios of the planetary gearsets 1220 and 1240. The numerical value for the fourth forward speed ratio is determined utilizing the ring gear/sun gear tooth ratios of the planetary gearsets 1230 and 1240. The numerical value for the fifth forward speed ratio is one. The numerical value for the sixth forward speed ratio is determined utilizing the ring gear/sun gear tooth ratios of the planetary gearsets 1220 and 1230.

Figures 23, 24:
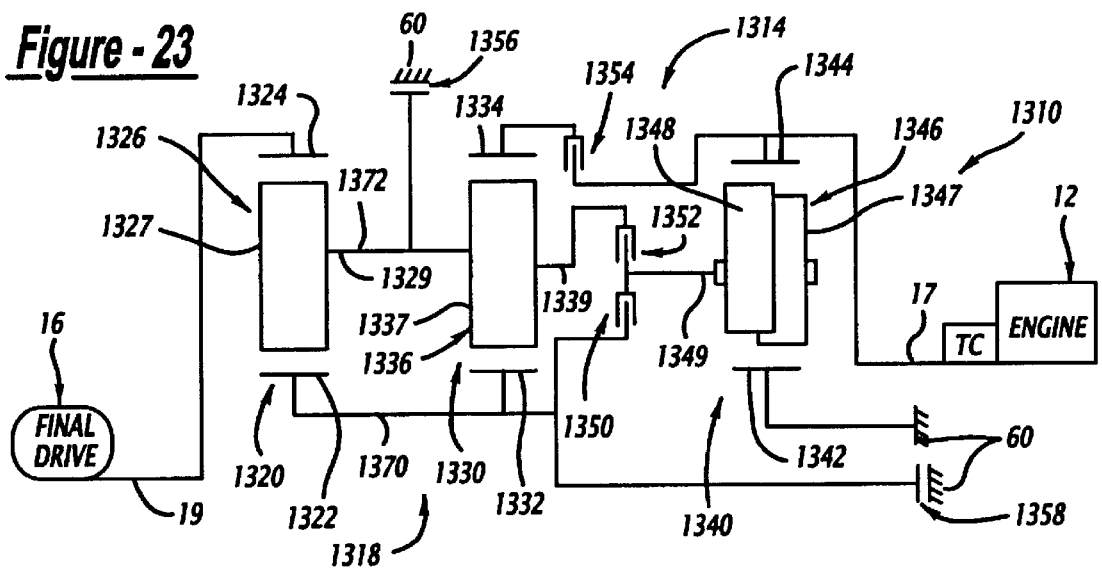
FIG. 23 is a schematic representation of a powertrain employing another family member incorporating the present invention.
FIG. 24 is a truth table and chart providing the engagement combination with the torque-transmitting mechanisms as well as speed ratio values of the family member shown in FIG. 23.

A powertrain 1310, shown in FIG. 23, includes the engine and torque converter 12, a planetary transmission 1314, and the final drive mechanism 16. The planetary transmission 1314 includes the input shaft 17, a planetary gear arrangement 1318, and the output shaft 19. The planetary gear arrangement 1318 includes three planetary gearsets 1320, 1330, and 1340. The planetary gear arrangement 1318 also includes three rotatable torque-transmitting mechanisms 1350, 1352, and 1354, and two stationary torque-transmitting mechanisms 1356 and 1358.

The planetary gearset 1320 includes a sun gear member 1322, a ring gear member 1324, and a planet carrier assembly member 1326 having a variety of pinion gears 1327 rotatably mounted on a planet carrier 1329 and disposed in meshing relationship with both the sun gear member 1322 and the ring gear member 1324.

The planetary gearset 1330 includes a sun gear member 1332, a ring gear member 1334, and a planet carrier assembly member 1336. The planet carrier assembly member 1336 has a plurality of pinion gears 1337 rotatably mounted on a planet carrier 1339 and disposed in meshing relationship with both the sun gear member 1332 and the ring gear member 1334.

The planetary gearset 1340 includes a sun gear member 1342, a ring gear member 1344, and a planet carrier assembly member 1346. The planet carrier assembly member 1346 includes a plurality of the intermeshing pinion gears 1347 and 1348 that are rotatably mounted on a planet carrier 1349 and disposed in meshing relationship with the sun gear member 1342 and the ring gear member 1344, respectively.

The sun gear members 1322 and 1332 are continuously interconnected by an interconnecting member 1370 and selectively connectible with the transmission housing 60 through the torque-transmitting mechanism 1358. The planet carrier assembly member 1326 and planet carrier assembly member 1336 are continuously connected by an interconnecting member 1372 and selectively connectible with the transmission housing 60 through the torque-transmitting mechanism 1356. The input shaft 17 is continuously connected with the ring gear member 1344 and selectively connectible with the ring gear member 1334 through the torque-transmitting mechanism 1354. The planet carrier assembly member 1346 is selectively connectible with the interconnecting member 1370 through the torque-transmitting mechanism 1350 and selectively connectible with the interconnecting member 1372 through the torque-transmitting mechanism 1352. The sun gear member 1342 is continuously connected with the transmission housing 60. The ring gear member 1334 is noncontinuously interconnected with any other element of the planetary gear arrangement 1318.

The planetary gear arrangement 1340 is an overdrive gearset. That is the planet carrier assembly member 1346 rotates more rapidly or at an increased speed relative to the input shaft 17.

FIG. 24 describes the engagement combinations and sequence for the torque-transmitting mechanisms in order to provide six forward speed ratios and one reverse speed ratio between the input shaft 17 and the output shaft 19. The truth table and chart of FIG. 24 also provides numerical examples for the speed ratios as well as examples of the ratio steps between adjacent forward speed ratios and between the reverse and first forward speed ratio. The numerical examples of the speed ratios are determined by the ring gear/sun gear tooth ratios of the planetary gearsets 1320, 1330, and 1340 as represented by the ratios R1/S1, R2/S2, and R3/S3, respectively.

Those skilled in the art will recognize that the numerical value for the reverse speed ratio is determined by the ring gear/sun gear tooth ratios of the planetary gearsets 1320 and 1340. The numerical values for the first and second forward speed ratios are determined by the ring gear/sun gear tooth ratios of the planetary gearsets 1320 and 1330. The numerical values for the third and fourth forward speed ratios are determined utilizing the ring gear/sun gear tooth ratios of all three planetary gearsets 1320, 1330, and 1340. The numerical value for the fifth forward speed ratio is determined by the ring gear/sun gear tooth ratio of the planetary gearset 1340. The numerical value for the sixth forward speed ratio is determined by the ring gear/sun gear tooth ratios of the planetary gearsets 1320 and 1340.

Figures 25, 26:
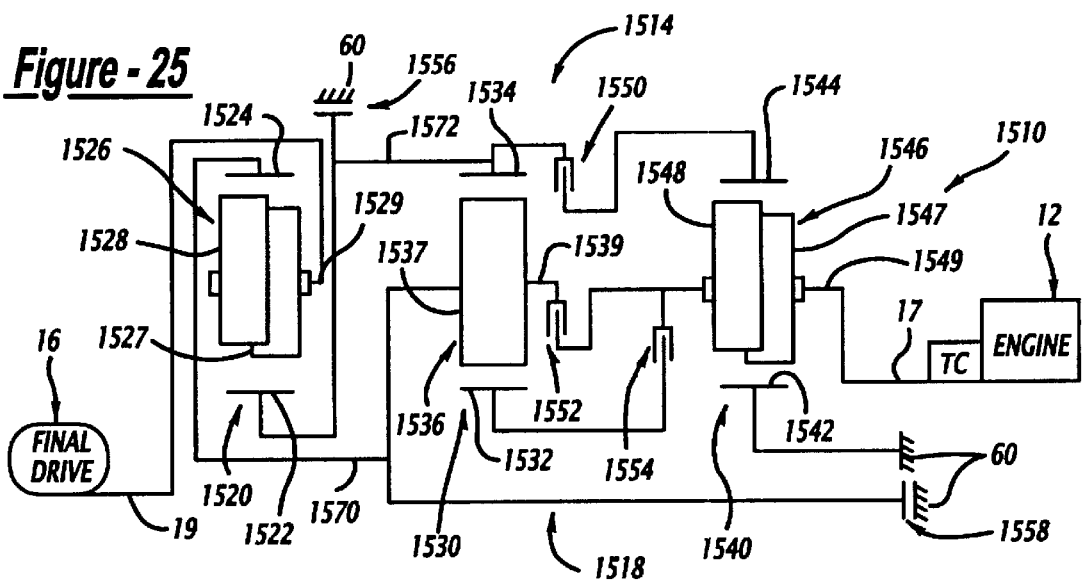
FIG. 25 is a schematic representation of a powertrain employing another family member incorporating the present invention.
FIG. 26 is a truth table and chart providing the engagement combination with the torque-transmitting mechanisms as well as speed ratio values of the family member shown in FIG. 25.

A powertrain 1510, shown in FIG. 25, includes the engine and torque converter 12, a planetary transmission 1514, and the final drive mechanism 16. The planetary transmission 1514 includes the input shaft 17, a planetary gear arrangement 1518, and the output shaft 19. The planetary gear arrangement 1518 includes three planetary gearsets 1520, 1530, and 1540. The planetary gear arrangement 1518 also includes three rotatable torque-transmitting mechanisms 1550, 1552, and 1554, and two stationary torque-transmitting mechanisms 1556 and 1558.

The planetary gearset 1520 includes a sun gear member 1522, a ring gear member 1524, and a planet carrier assembly member 1526. The planet carrier assembly member 1526 includes a plurality of intermeshing pinion gears 1527 and 1528 that are rotatably mounted on a carrier 1529 and disposed in meshing relationship with the sun gear member 1522 and the ring gear/sun gear tooth ratio 1524.

The planetary gearset 1530 includes a sun gear member 1532, a ring gear member 1534, and a planet carrier assembly member 1536. The planet carrier assembly member 1536 has a plurality of pinion gears 1537 rotatably mounted on a planet carrier 1539 and disposed in meshing relationship with both the sun gear member 1532 and the ring gear member 1534.

The planetary gearset 1540 includes a sun gear member 1542, a ring gear member 1544, and a planet carrier assembly member 1546. The planet carrier assembly member 1546 includes a plurality of pinion gears 1547 and 1548 that are rotatably mounted on a planet carrier 1549 and disposed in meshing relationship with each other and with the sun gear member 1542 and ring gear member 1544, respectively.

The ring gear member 1524 and planet carrier assembly member 1536 are continuously interconnected by an interconnecting member 1570 and selectively connectible with the transmission housing 60 through the torque-transmitting mechanism 1558. The sun gear member 1522 and ring gear member 1534 are continuously interconnected by an interconnecting member 1572, selectively connectible with the ring gear member 1544 through the torque-transmitting mechanism 1550, and selectively connectible with the transmission housing 60 through the torque-transmitting mechanism 1556. The input shaft 17 is continuously connected between the engine and torque converter 12 and the planet carrier assembly member 1546, selectively connectible with the sun gear member 1532 through the torque-transmitting mechanism 1554, and selectively connectible with the interconnecting member 1570 through the torque-transmitting mechanism 1552. The sun gear member 1542 is continuously connected with the transmission housing 60. The output shaft 19 is continuously connected between the final drive mechanism 16 and the planet carrier assembly member 1526. The sun gear member 1532 is not continuously interconnected with any other element of the planetary gear arrangement 1518.

The ring gear member 1544 is underdriven relative to the input shaft 17. The underdrive ratio is determined by the ring gear/sun gear tooth ratio of the planetary gearset 1540.

FIG. 26 provides a truth table and chart. The truth table describes the engagement combinations for the torque-transmitting mechanisms in order to produce the six forward speed ratios and one reverse speed ratio of the planetary gear arrangement 1518. The chart defines the ratio steps between adjacent speed ratios and between the reverse and first forward speed ratio when the example of numerical values given in the truth table are utilized. These numerical values for the speed ratios are determined by the ring gear/sun gear tooth ratios of the planetary gearsets 1520, 1530, and 1540 as represented by the ratios R1/S1, R2/S2, and R3/S3, respectively.

Those skilled in the art will recognize that the numerical value for the reverse speed ratio is determined utilizing the ring gear/sun gear tooth ratios of the planetary gearsets 1520 and 1540. The numerical values for both the first and second forward speed ratios are determined utilizing the ring gear/sun gear tooth ratios of the planetary gearsets 1520 and 1530. The numerical value for the third forward speed ratio is determined utilizing the ring gear/sun gear tooth ratios of all three planetary gearsets 1520, 1530, and 1540. The numerical value for the fourth forward speed ratio is one. The numerical value for the fifth forward speed ratio is determined utilizing the ring gear/sun gear tooth ratios of the planetary gearsets 1520 and 1540. The numerical value for the sixth forward speed ratio is determined utilizing the ring gear/sun gear tooth ratio of the planetary gearset 1520.

Each of the family members has a number of identical characteristics or structures. Each family member has an input gearset that is continuously connected with the engine of the powertrain. Each family member has two downstream or ratio planetary gearsets that are connectible with the input gearset through selectively engageable torque-transmitting mechanisms. Each of these downstream gearsets also has members that are selectively connectible with a transmission housing to provide reaction members within the ratio gearsets. Each of the ratio gearsets has first members that are continuously interconnected and each of the ratio gearsets has second members that are continuously interconnected.

At least one of the ratio gearsets has a member that is noncontinuously interconnected with any other element or component of the planetary gear arrangement representing the family member. The input gearset also has a member that is noncontinuously connected with any other element or member of the planetary gear arrangement. This normally nonconnected input gearset element is rotated at a ratio relative to the input shaft determined by the ring gear/sun gear tooth ratio of the input planetary gearset, the type of planetary gearset (single or double pinion), and the input member. This normally nonconnected member may rotate either faster than the input shaft or slower than the input shaft, depending upon the particular connections of elements within the planetary gearset.

At least one of the ratio planetary gearsets has an element connected continuously with the output shaft of the transmission. In some instances, at least one of the interconnected members is continuously connected with the output shaft. In all of the family members, the input shaft and therefore the one member of the input planetary gearset is selectively connectible with at least one member of the downstream or ratio planetary gearsets through individually selectively engageable torque-transmitting mechanisms. The normally nonconnected member of the input gearset is selectively connectible in all instances with at least one member of the ratio gearsets, and in some instances, with one of the interconnected members of the ratio gearsets.

In all of the family members, the first interconnecting member is continuously connected with the output shaft or selectively connectable to the transmission housing through a stationary torque transmitting mechanism. The second interconnecting member is selectively connectable to the transmission housing through a stationary torque transmitting mechanism, or selectively connectable with the non-continuously connected third member of the third planetary gear set through a rotating torque transmitting mechanism.

In a number of the family members, both of the interconnecting members for the ratio gearsets are selectively connectible individually with the transmission housing through torque-transmitting mechanisms. In all of the family members, the more rapidly rotating input member is connected to the downstream ratio gearsets by two torque-transmitting mechanisms. In other words, if the input shaft is the more rapidly rotating input member, then the input shaft is connected through two selectively engageable torque-transmitting mechanisms. If the normally nonconnected member of the input gearset is an overdriven member, in other words rotates faster than the input shaft, then this member is connected through two selectively engageable torque-transmitting mechanisms to individual or interconnected components of the ratio gearsets.

One such example of this type of family member can be seen in FIG. 1. Note that in FIG. 1 that the sun gear member 42 is overdriven or rotates faster than the input shaft 17. The sun gear member 42 is selectively connectible through the torque-transmitting mechanism 52, and the torque-transmitting mechanism 50 to the interconnected members 72 and 70, respectively. In this case, the slower rotating planet carrier assembly member 46 (input shaft 17) is connected through the torque-transmitting mechanism 54 to the normally nonconnected member of the ratio gearsets.

What is claimed is:

1. A planetary transmission comprising:

an input shaft adapted to be connected with a power source;

an output shaft adapted to be connected to a drive mechanism;

a stationary transmission housing;

a first planetary gearset having first, second, and third members;

a second planetary gearset having a first member continuously interconnected with said first member of said first planetary gearset through a first interconnecting member, a second member connected with a second member of said first planetary gearset through a second interconnecting member, and a third member;

said output shaft being continuously interconnected with at least one member of said first or second planetary gearsets;

a third planetary gearset having a first member continuously connected with said input shaft, a second member continuously connected with a stationary housing of said transmission, and a non-continuously interconnected third member, one of said first and third members being a faster rotating member and the other of said first and third members being a slower rotating member;

a first torque transmitting mechanism operatively selectively connectable between said slower rotating member and at least one member of said first and second planetary gearsets;

a second torque transmitting mechanism operatively selectively connectable between said faster rotating member and at least one member of said first and second planetary gearsets;

third, fourth, and fifth torque transmitting mechanisms; and only said five torque transmitting mechanisms being selectively engaged in combinations of two to establish at least six forward speed ratios and one reverse speed ratio between said input shaft and said output shaft.

2. The transmission defined in claim 1 further wherein:

said first member of said first planetary gearset is a member selected from a group consisting of a sun gear member, a ring gear member, and a planet carrier assembly member;

said second member of said first planetary gearset is a member selected from a group consisting of a sun gear member, a ring gear member, and a planet carrier assembly member that is not said first member; and said third member of said first planetary gearset is a member selected from a group consisting of a sun gear member, a ring gear member, and a planet carrier assembly member that is not one of said first member, and said second member.

3. The transmissions defined in claim 1 further wherein:

said first member of said second planetary gearset is a member selected from a group consisting of a sun gear member, a ring gear member, and a planet carrier assembly member;

said second member of said second planetary gearset is a member selected from a group consisting of a sun gear member, a ring gear member, and a planet carrier assembly member that is not said first member of said second planetary gearset; and said third member of said second planetary gearset is a member selected from a group consisting of a sun gear member, a ring gear member, and a planet carrier assembly member that is not one of said first member, and said second member of said second planetary gear set.

4. The transmissions defined in claim 1 further wherein:

said first member of said third planetary gearset is a member selected from a group consisting of a sun gear member, a ring gear member, and a planet carrier assembly member;

said second member of said third planetary gearset is a member selected from a group consisting of a sun gear member, a ring gear member, and a planet carrier assembly member that is not said first member; and said third member of said third planetary gearset is a member selected from a group consisting of a sun gear member, a ring gear member, and a planet carrier assembly member that is not one of said first member, and said second member.

5. A transmission comprising:

an input shaft adapted to deliver power;

an output shaft adapted to deliver power from said transmission;

a stationary transmission housing adapted to enclose said transmission;

a planetary gear arrangement comprising three planetary gearsets, three selectively engageable rotating torque transmitting mechanisms, two stationary torque transmitting mechanisms, a first interconnecting member, and a second interconnecting member;

each of said planetary gearsets comprising first, second, and third members, said first members of said first and second planetary gearsets being continuously interconnected by said first interconnecting member, said second members of said first and second planetary gearsets being continuously interconnected by said second interconnecting member at least one member selected from a group consisting of said third members of said first and second planetary gearsets being non-continuously interconnected, said first member of said third planetary gearset being continuously interconnected with said input shaft, said second member of said third planetary gearset being continuously interconnected with said housing, said third member of said third planetary gearset being non-continuously interconnected, one of said first and third members of said third planetary gearset being a faster rotating member and the other being a slower rotating member;

first, second, and third rotating torque transmitting mechanisms and first and second stationary torque transmitting mechanisms being selectively engageable in combinations of two to establish six forward speed ratios and one reverse speed ratio between said input shaft and said output shaft wherein:

said output shaft is continuously connected with said third member of said second planetary gearset, said first rotating torque-transmitting mechanism is selectively interconnecting said input shaft with said first interconnecting member, said second rotating torque-transmitting mechanism is selectively interconnecting said input shaft with said second interconnecting member, said third rotating torque-transmitting mechanism is selectively interconnecting said third member of said third planetary gearset with said third member of said first planetary gearset, said first stationary torque-transmitting mechanism is selectively interconnecting said transmission housing with said first interconnecting member, and said second stationary torque-transmitting mechanism is selectively interconnecting said transmission housing with said second interconnecting member, or said output shaft is continuously connected with said third member of said first planetary gearset, said first rotating torque-transmitting mechanism is selectively interconnecting said input shaft with said first interconnecting member, said second rotating torque-transmitting mechanism is selectively interconnecting said input shaft with said second interconnecting member, said third rotating torque-transmitting mechanism is selectively interconnecting said third member of said third planetary gearset with said third member of said second planetary gearset, said first stationary torque-transmitting mechanism is selectively interconnecting said transmission housing with said first interconnecting member, and said second stationary torque-transmitting mechanism is selectively interconnecting said transmission housing with said second interconnecting member, or said output shaft is continuously connected with said third member of said first planetary gearset, said first rotating torque-transmitting mechanism is selectively interconnecting said third member of said third planetary gearset with said first interconnecting member, said second rotating torque-transmitting mechanism is selectively interconnecting said third member of said third planetary gearset with said second interconnecting member, said third rotating torque-transmitting mechanism is selectively interconnecting said input shaft with said third member of said second planetary gearset, said first stationary torque-transmitting mechanism is selectively interconnecting said transmission housing with said first interconnecting member, and said second stationary torque-transmitting mechanism is selectively interconnecting said transmission housing with said second interconnecting member, or said output shaft is continuously connected with said third member of said first planetary gearset, said first rotating torque-transmitting mechanism is selectively interconnecting said input shaft with said first interconnecting member, said second rotating torque-transmitting mechanism is selectively interconnecting said third member of said third planetary gearset with said second interconnecting member, said third rotating torque-transmitting mechanism is selectively interconnecting said input shaft with said third member of said second planetary gearset, said first stationary torque-transmitting mechanism is selectively interconnecting said transmission housing with said first interconnecting member, and said second stationary torque-transmitting mechanism is selectively interconnecting said transmission housing with said second interconnecting member, or said output shaft is continuously connected with said second interconnecting member, said first rotating torque-transmitting mechanism is selectively interconnecting said input shaft with said first interconnecting member, said second rotating torque-transmitting mechanism is selectively interconnecting said input shaft with said third member of said first planetary gearset, said third rotating torque-transmitting mechanism is selectively interconnecting said third member of said third planetary gearset with said third member of said second planetary gearset, said first stationary torque-transmitting mechanism is selectively interconnecting said transmission housing with said first interconnecting member, and said second stationary torque-transmitting mechanism is selectively interconnecting said transmission housing with said third member of said second planetary gearset, or said output shaft is continuously connected with said third member of said first planetary gearset, said first rotating torque-transmitting mechanism is selectively interconnecting said third member of said third planetary gearset with said second interconnecting member, said second rotating torque-transmitting mechanism is selectively interconnecting said input shaft with said first interconnecting member, said third rotating torque-transmitting mechanism is selectively interconnecting said input shaft with said third member of said second planetary gearset, said first stationary torque-transmitting mechanism is selectively interconnecting said transmission housing with said first interconnecting member, and said second stationary torque-transmitting mechanism is selectively interconnecting said transmission housing with said third member of said second planetary gearset, or said output shaft is continuously connected with said third member of said first planetary gearset, said first rotating torque-transmitting mechanism is selectively interconnecting said third member of said second planetary gearset with said first interconnecting member, said second rotating torque-transmitting mechanism is selectively interconnecting said third member of said third planetary gearset with said second interconnecting member, said third rotating torque-transmitting mechanism is selectively interconnecting said input shaft with said third member of said second planetary gearset, said first stationary torque-transmitting mechanism is selectively interconnecting said transmission housing with said second interconnecting member, and said second stationary torque-transmitting mechanism is selectively interconnecting said transmission housing with said third member of said second planetary gearset, or said output shaft is continuously connected with said third member of said first planetary gearset, said first rotating torque-transmitting mechanism is selectively interconnecting said third member of said third planetary gearset with said first interconnecting member, said second rotating torque-transmitting mechanism is selectively interconnecting said input shaft with said second interconnecting member, said third rotating torque-transmitting mechanism is selectively interconnecting said input shaft with said third member of said second planetary gearset, said first stationary torque-transmitting mechanism is selectively interconnecting said transmission housing with said first interconnecting member, and said second stationary torque-transmitting mechanism is selectively interconnecting said transmission housing with said second interconnecting member, or said output shaft is continuously connected with said second interconnecting member, said first rotating torque-transmitting mechanism is selectively interconnecting said input shaft with said first interconnecting member, said second rotating torque-transmitting mechanism is selectively interconnecting said input shaft with said third member of said first planetary gearset, said third rotating torque-transmitting mechanism is selectively interconnecting said third member of said third planetary gearset with said third member of said second planetary gearset, said first stationary torque-transmitting mechanism is selectively interconnecting said transmission housing with said third member of said first planetary gearset, and said second stationary torque-transmitting mechanism is selectively interconnecting said transmission housing with said third member of said second planetary gearset, or said output shaft is continuously connected with said second interconnecting member, said first rotating torque-transmitting mechanism is selectively interconnecting said input shaft with said first interconnecting member, said second rotating torque-transmitting mechanism is selectively interconnecting said third member of said first planetary gearset with said third member of said third planetary gearset, said third rotating torque-transmitting mechanism is selectively interconnecting said input shaft with said third member of said second planetary gearset, said first stationary torque-transmitting mechanism is selectively interconnecting said transmission housing with said third member of said second planetary gearset, and said second stationary torque-transmitting mechanism is selectively interconnecting said transmission housing with said third member of said first planetary gearset, or said output shaft is continuously connected with said third member of said first planetary gearset, said first rotating torque-transmitting mechanism is selectively interconnecting said third member of said third planetary gearset with said second interconnecting member, said second rotating torque-transmitting mechanism is selectively interconnecting said input shaft with said first interconnecting member, said third rotating torque-transmitting mechanism is selectively interconnecting said input shaft with said third member of said second planetary gearset, said first stationary torque-transmitting mechanism is selectively interconnecting said transmission housing with said second interconnecting member, and said second stationary torque-transmitting mechanism is selectively interconnecting said transmission housing with said first interconnecting member, or said output shaft is continuously connected with said third member of said first planetary gearset, said first rotating torque-transmitting mechanism is selectively interconnecting said input shaft with said first interconnecting member, said second rotating torque-transmitting mechanism is selectively interconnecting said input shaft with said second interconnecting member, said third rotating torque-transmitting mechanism is selectively interconnecting said third member of said third planetary gearset with said third member of said second planetary gearset, said first stationary torque-transmitting mechanism is selectively interconnecting said transmission housing with said second interconnecting member, and said second stationary torque-transmitting mechanism is selectively interconnecting said transmission housing with said first interconnecting member, or said output shaft is continuously connected with said second interconnecting member, said first rotating torque-transmitting mechanism is selectively interconnecting said third member of said third planetary gearset with said first interconnecting member, said second rotating torque-transmitting mechanism is selectively interconnecting said input shaft with said third member of said first planetary gearset, said third rotating torque-transmitting mechanism is selectively interconnecting said input shaft with said third member of said second planetary gearset, said first stationary torque-transmitting mechanism is selectively interconnecting said transmission housing with said third member of said first planetary gearset, and said second stationary torque-transmitting mechanism is selectively interconnecting said transmission housing with said third member of said second planetary gearset, or said output shaft is continuously connected with said third member of said first planetary gearset, said first rotating torque-transmitting mechanism is selectively interconnecting said third member of said third planetary gearset with said first interconnecting member, said second rotating torque-transmitting mechanism is selectively interconnecting said third member of said third planetary gearset with said second interconnecting member, said third rotating torque-transmitting mechanism is selectively interconnecting said input shaft with said third member of said second planetary gearset, said first stationary torque-transmitting mechanism is selectively interconnecting said transmission housing with said second interconnecting member, and said second stationary torque-transmitting mechanism is selectively interconnecting said transmission housing with said first interconnecting member, or said output shaft is continuously connected with said second interconnecting member, said first rotating torque-transmitting mechanism is selectively interconnecting said input shaft with said first interconnecting member, said second rotating torque-transmitting mechanism is selectively interconnecting said input shaft with said third member of said first planetary gearset, said third rotating torque-transmitting mechanism is selectively interconnecting said third member of said third planetary gearset with said third member of said second planetary gear, said first stationary torque-transmitting mechanism is selectively interconnecting said transmission housing with said third member of said second planetary gearset, and said second stationary torque-transmitting mechanism is selectively interconnecting said transmission housing with said third member of said first planetary gearset, or said output shaft is continuously connected with said third member of said first planetary gearset, said first rotating torque-transmitting mechanism is selectively interconnecting said third member of said third planetary gearset with said second interconnecting member, said second rotating torque-transmitting mechanism is selectively interconnecting said input shaft with said first interconnecting member, said third rotating torque-transmitting mechanism is selectively interconnecting said input shaft with said third member of said second planetary gearset, said first stationary torque-transmitting mechanism is selectively interconnecting said transmission housing with said second interconnecting member, and said second stationary torque-transmitting mechanism is selectively interconnecting said transmission housing with said first interconnecting member.

6. The transmission defined in claim 5 further wherein:
said first member of each of said planetary gearsets is a member selected from a first group consisting of a sun gear member, a ring gear member, and a planet carrier assembly member; said second member of each of said planetary gearsets is a member selected from a second group consisting of the members of said first group that is not selected as the first member, and said third member of each of said planetary gearsets is the remaining member of said second group that is not selected as one of said first member and said second member.

* * * * *